(12) United States Patent
Kobayashi et al.

(10) Patent No.: US 11,936,962 B2
(45) Date of Patent: Mar. 19, 2024

(54) INFORMATION PROCESSING DEVICE AND INFORMATION PROCESSING METHOD

(71) Applicant: SONY GROUP CORPORATION, Tokyo (JP)

(72) Inventors: Yoshiyuki Kobayashi, Tokyo (JP); Toshiya Hamada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 170 days.

(21) Appl. No.: 17/433,580

(22) PCT Filed: Mar. 5, 2020

(86) PCT No.: PCT/JP2020/009311
§ 371 (c)(1),
(2) Date: Aug. 24, 2021

(87) PCT Pub. No.: WO2020/184357
PCT Pub. Date: Sep. 17, 2020

(65) Prior Publication Data
US 2022/0124419 A1      Apr. 21, 2022

(30) Foreign Application Priority Data

Mar. 8, 2019   (JP) ................................ 2019-043187

(51) Int. Cl.
*H04N 21/845* (2011.01)
*H04N 21/233* (2011.01)
(Continued)

(52) U.S. Cl.
CPC ....... *H04N 21/8456* (2013.01); *H04N 21/233* (2013.01); *H04N 21/234381* (2013.01); *H04N 21/4335* (2013.01); *H04N 21/85406* (2013.01)

(58) Field of Classification Search
None
See application file for complete search history.

(56) References Cited

U.S. PATENT DOCUMENTS

2013/0282918 A1   10/2013   De Vleeschauwer et al.
2015/0296269 A1*  10/2015   Tokumo ............. H04N 21/2187
                                                                725/100
(Continued)

FOREIGN PATENT DOCUMENTS

CN       103283255 A      9/2013
EP         2472866 A1      7/2012
(Continued)

OTHER PUBLICATIONS

International Search Report and Written Opinion of PCT Application No. PCT/JP2020/009311, dated Jun. 2, 2020, 09 pages of ISRWO.

(Continued)

*Primary Examiner* — Heather R Jones
(74) *Attorney, Agent, or Firm* — CHIP LAW GROUP

(57) ABSTRACT

Provided is an information processing device includes a receiving unit that receives a segment file having a plurality of segments and a setting file in which a group to which the segment file belongs is set, and an extraction unit that extracts one or more MP4 samples included in a segment of the segment file and adds attribute information including a reproduction start time of the MP4 sample to the MP4 sample. The information processing device further includes a determination unit that determines a switching position at which the segment file belonging to the group after switching is output in units of the MP4 samples on the basis of an accepted switching operation of the group and the attribute information, and an output unit that outputs an output signal generated from the segment file belonging to the group after the switching from the switching position to an output device.

14 Claims, 35 Drawing Sheets

(51) Int. Cl.
*H04N 21/2343* (2011.01)
*H04N 21/4335* (2011.01)
*H04N 21/854* (2011.01)

(56) References Cited

U.S. PATENT DOCUMENTS

2016/0353148 A1* 12/2016 Prins ............... H04N 21/2187
2017/0134768 A1 5/2017 Hirabayashi
2020/0186849 A1* 6/2020 Stratton ........... H04N 21/23439

FOREIGN PATENT DOCUMENTS

| EP | 2908535 A1 | 8/2015 |
|---|---|---|
| JP | 2003-348548 A | 12/2003 |
| JP | 2014-506424 A | 3/2014 |
| KR | 10-2013-0112936 A | 10/2013 |
| WO | 2012/093034 A1 | 7/2012 |
| WO | 2014/057896 A1 | 4/2014 |
| WO | 2016/002493 A1 | 1/2016 |

OTHER PUBLICATIONS

"Information technology—High efficiency coding and media delivery in heterogeneous environments—Part 3: 3D audio, Amendment 2: MPEG-H 3D Audio File Format Support", ISO/IEC 23008-3:2019, Feb. 2019, 798 pages.

"Information technology—Coding of audio-visual objects—Part 12: ISO base media file format", ISO/IEC 14496-12:2020, Dec. 2020, 245 pages.

"Information technology—Dynamic adaptive streaming over HTTP (DASH)—Part 1: Media presentation description and segment formats", ISO/IEC 23009-1:2019, Aug. 2019, 225 pages.

\* cited by examiner

*FIG. 9*

| SEGMENT ATTRIBUTE INFORMATION | GROUP INFORMATION (32bit) |
| --- | --- |
| | BIT STREAM NUMBER (32bit) |
| | SEGMENT NUMBER (32bit) |
| | OUTPUT TIME (64bit) |
| | Usage DATA (8bit) |
| SEGMENT LENGTH = N (32bit) | |
| SEGMENT (N BYTE) | |

*FIG. 11*

| MP4 SAMPLE ATTRIBUTE INFORMATION | GROUP INFORMATION (32bit) |
| --- | --- |
| | BIT STREAM NUMBER (32bit) |
| | SEGMENT NUMBER (32bit) |
| | MP4 SAMPLE NUMBER (32bit) |
| | Usage DATA (8bit) |
| | OUTPUT TIME (64bit) |
| MP4 SAMPLE LENGTH = M (32bit) ||
| MP4 SAMPLE (M BYTE) ||

FIG. 13

| OUTPUT SIGNAL ATTRIBUTE INFORMATION | GROUP INFORMATION (32bit) |
|---|---|
| | OUTPUT TIME (64bit) |
| OUTPUT SIGNAL LENGTH = N (32bit) ||
| OUTPUT SIGNAL (N BYTE) ||

FIG. 35

| MP4 SAMPLE ATTRIBUTE INFORMATION | GROUP INFORMATION (32bit) |
| --- | --- |
| | BIT STREAM NUMBER (32bit) |
| | SEGMENT NUMBER (32bit) |
| | MP4 SAMPLE NUMBER (32bit) |
| | Usage DATA (8bit) |
| | POSSIBLE POINT INFORMATION (8bit) |
| | DISPLAY TIME (64bit) |
| MP4 SAMPLE LENGTH = M (32bit) | |
| MP4 SAMPLE (M BYTE) | |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/009311 filed on Mar. 5, 2020, which claims priority benefit of Japanese Patent Application No. JP 2019-043187 filed in the Japan Patent Office on Mar. 8, 2019. Each of the above-referenced applications is hereby incorporated herein by reference in its entirety.

TECHNICAL FIELD

The present disclosure relates to an information processing device, an information processing method, and an information processing program.

BACKGROUND ART

In streaming reproduction, in a case where content is switched by viewpoint switching, audio language switching, and the like, content switching is executed in units of segments obtained by dividing a bit stream.

CITATION LIST

Non-Patent Documents

Non-Patent Document 1: Information technology—High efficiency coding and media delivery in heterogeneous environments—Part 3: 3D audio, AMENDMENT 2: MPEG-H 3D Audio File Format Support Non-Patent Document 2: INTERNATIONAL STANDARD ISO/IEC 14496-12 Information technology—Coding of audio-visual objects—Part 12: ISO base media file format Non-Patent Document 3: INTERNATIONAL STANDARD ISO/IEC 23009-1 Information technology—Dynamic adaptive streaming over HTTP (DASH)—Part 1: Media presentation description and segment formats

SUMMARY OF THE INVENTION

Problems to be Solved by the Invention

However, in a case where a segment length set by a content creator is long, since content switching is executed in units of segments, it takes time to start output of content after switching, which is recognized as a switching delay by a user.

Therefore, the present disclosure proposes an information processing device, an information processing method, and an information processing program capable of reducing a time required for content switching.

Solutions to Problems

In order to solve the above problem, an information processing device according to an aspect of the present disclosure includes: a receiving unit that receives a segment file including a plurality of segments and a setting file in which a group to which the segment file belongs is set; an extraction unit that extracts one or more MP4 samples included in the segment of the segment file received by the receiving unit and adds attribute information including a reproduction start time of the MP4 sample to the MP4 sample; a determination unit that determines a switching position at which the segment file belonging to the group after switching is output in units of the MP4 samples on the basis of an accepted switching operation of the group and the attribute information; and an output unit that outputs an output signal generated from the segment file belonging to the group after the switching from the switching position to the output device.

BRIEF DESCRIPTION OF DRAWINGS

FIG. 9 is a diagram illustrating a data configuration example of a segment stored in a segment buffer according to the first embodiment of the present disclosure.

FIG. 11 is a diagram illustrating a data configuration example of an MP4 sample stored in an MP4 sample buffer according to the first embodiment of the present disclosure.

FIG. 13 is a diagram illustrating a data configuration example of an output signal stored in an output buffer according to the first embodiment of the present disclosure.

FIG. 35 is a diagram illustrating a data configuration example of an MP4 sample stored in the MP4 sample buffer according to a modified example (1) of the present disclosure.

MODE FOR CARRYING OUT THE INVENTION

Figure 1:
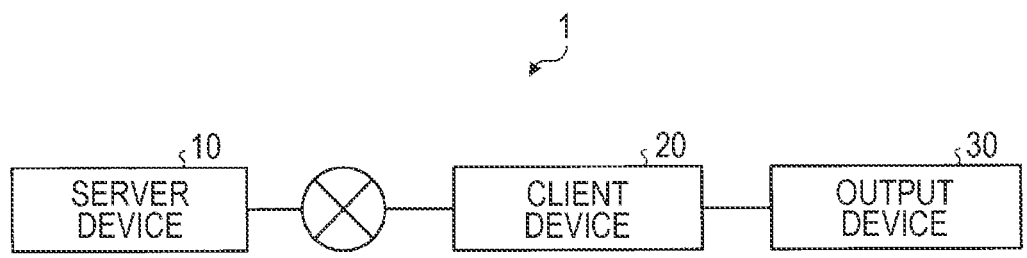
FIG. 1 is a diagram illustrating a configuration example of a streaming system according to a first embodiment of the present disclosure.

Hereinafter, embodiments of the present disclosure will be described in detail on the basis of the drawings. Note that, in each of the following embodiments, the same parts are denoted by the same reference numerals, and redundant description will be omitted.

For example, in a case where streaming reproduction of content is executed according to a moving picture experts group (MPEG)-dynamic adaptive streaming over HTTP (DASH) standard, a client acquires a media presentation description (MPD) file from a server device. Then, the client acquires one or a plurality of segment files included in the content on the basis of the MPD file. In other words, the client receives a bit stream of the segment file transmitted from the server device.

The segment file is, for example, data such as an audio object, metadata, and the like. The audio object is a material sound that is a component for generating a sound field. For example, in a case of music, the audio object is sound of a musical instrument such as sound of a guitar, sound of a drum, and the like. Note that what is treated as the audio object is determined by a content creator. The metadata is localization information of the audio object represented by a relative position from a viewing position serving as a predetermined reference. Furthermore, the audio object and the metadata are associated by grouping. In other word, the segment files are associated by grouping. Then, the client can reproduce audio corresponding to a user's viewing position by reproducing the audio object on the basis of the metadata.

Incidentally, in a case where a content group is switched due to switching of a viewing position, switching of audio language, and the like, the client receives a bit stream of the group after the switching. At this time, the client switches the group in units of segments forming the segment file. In other words, after reproducing a bit stream of the group before the switching stored in a buffer, the client reproduces the bit stream of the group after the switching in units of segments.

A segment length is set by the content creator. Therefore, in a case where the segment length is set to be long, it takes time for the client to finish reproducing the bit stream of the group before the switching. In other words, it takes time for the client to start reproducing the bit stream of the group after the switching, which is recognized as a switching delay by the user.

Therefore, an information processing device, an information processing method, and an information processing program capable of reducing a time required for content switching will be described according to the following embodiments.

First Embodiment

Configuration of System According to First Embodiment

FIG. 1 is a diagram illustrating a configuration example of a streaming system 1 according to a first embodiment. The streaming system 1 includes a server device 10, a client device 20, and an output device 30. The server device 10 and the client device 20 are communicably connected via a network such as the Internet and the like. Furthermore, the client device 20 and the output device 30 are communicably connected. Although FIG. 1 illustrates one server device 10, one client device 20, and one output device 30, the number of each device may be plural. Note that, in the first embodiment, a case where a target of streaming reproduction is audio will be described as an example. However, the target of streaming reproduction is not limited to the audio, and may be a moving image or a combination of the audio and the moving image.

In this case, the server device 10 distributes texture and vertex data separately, for example. More specifically, the server device 10 distributes a video stream obtained by combining texture groups into one video frame and compressed by MPEG4-AVC and vertex data (polygon) used for texture mapping in different MP4 files. Then, in primary decoding of the texture, the client device 20 decodes the video stream and outputs a YUV signal. Furthermore, in primary decoding of the vertex data, the client device 20 decodes the vertex data and outputs a list of two-dimensional coordinate data. Then, in secondary decoding, the client device 20 executes texture mapping and outputs a baseband YUV signal.

The server device 10 is, for example, a hypertext transfer protocol (HTTP) server. The server device 10 transmits content such as audio, a moving image, and the like in response to a request from the client device 20. At this time, the server device 10 transmits a bit stream encoded by an MPEG-H 3D Audio system as content.

The client device 20 is an information processing device that reproduces the content transmitted from the server device 10. The client device 20 has, for example, a communication function, a primary decoding function, a secondary decoding function, and an output function. The communication function is a function of performing communication conforming to the HTTP protocol. For example, in the communication function, a bit stream encoded by the MPEG-H 3D Audio system is received.

Here, in the MPEG-H 3D Audio encoding system, an audio object and metadata can be encoded independently. Then, in the MPEG-H 3D Audio encoding system, the audio object and the metadata can be transmitted separately. As described above, by separately transmitting the audio object and the metadata, it is possible to easily process a specific sound source at the time of reproduction, which has been difficult with a conventional encoding system (for example, volume adjustment, addition of an effect, and the like). Moreover, by executing rendering of an audio object using corresponding metadata and assigning the rendered data to each speaker constituting reproduction environment (speaker arrangement and the like), audio can be reproduced three-dimensionally.

The primary decoding function is a function of performing processing of decompressing signal data of a compressed audio object and processing of extracting position information from encoded metadata. The secondary decoding function is a function of performing rendering of an audio object by using corresponding metadata. The output function is a function of outputting audio data after the secondary decoding to the output device 30 such as a speaker and the like.

The output device 30 is, for example, an audio output device such as a speaker and the like. Note that the output device 30 is not limited to the audio output device, and may be an image output device such as a display and the like.

Configuration of Server Device 10 According to First Embodiment

Figure 2:
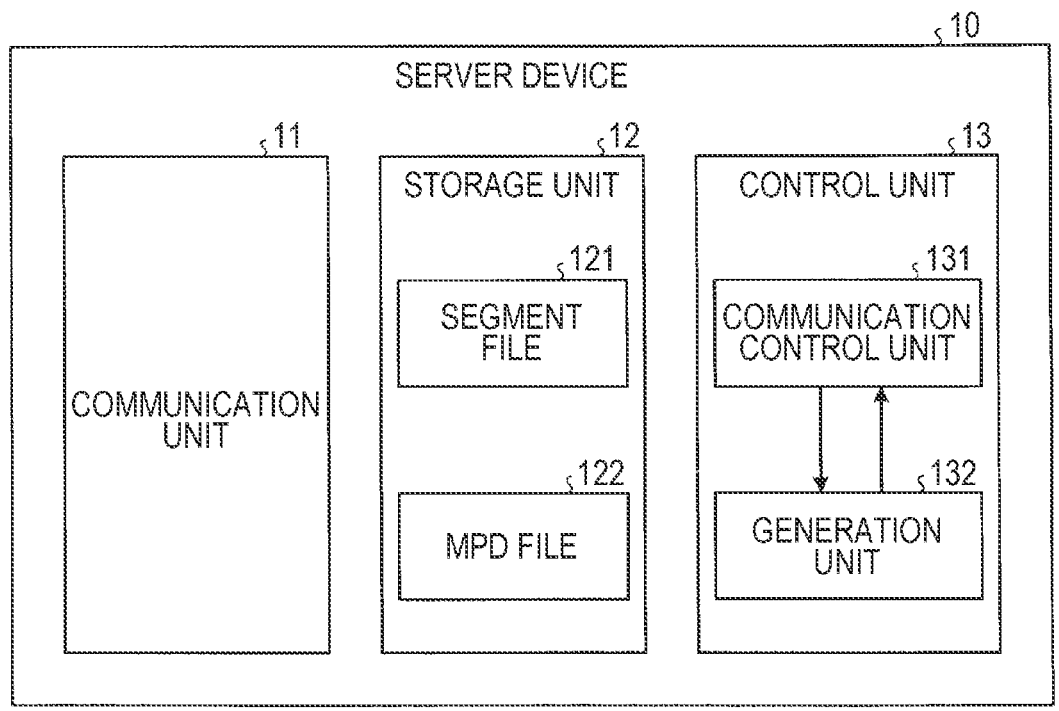
FIG. 2 is a diagram illustrating a configuration example of a server device according to the first embodiment of the present disclosure.

FIG. 2 is a diagram illustrating a configuration example of the server device 10 according to the first embodiment. The server device 10 includes a communication unit 11, a storage unit 12, and a control unit 13.

The communication unit 11 is realized by, for example, a network interface card (NIC) and the like. The communication unit 11 transmits and receives information to and from the client device 20 via the network.

The storage unit 12 is realized by, for example, a semiconductor memory element such as a random access memory (RAM), a flash memory, and the like, or a storage device such as a hard disk, an optical disk, and the like. The storage unit 12 stores, for example, a segment file 121 and an MPD file 122. Note that the segment file 121 and the MPD file 122 may be stored in another device without being limited to the server device 10.

Figure 3:
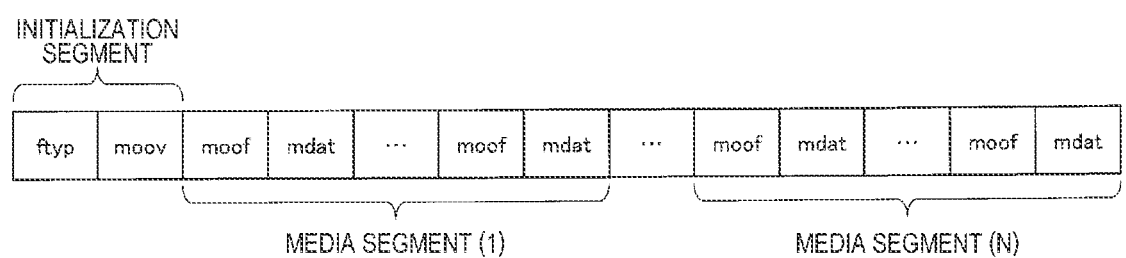
FIG. 3 is a diagram illustrating a data configuration example of a segment file according to the first embodiment of the present disclosure.

The segment file 121 is an MP4 format file in which media such as an audio object is divided in units of segments. Furthermore, the segment file 121 is referred to in the MPD file 122. Here, FIG. 3 is a diagram illustrating a data configuration example of the segment file 121 according to the first embodiment. The segment file 121 includes an initialization segment and one or a plurality of media segments. Then, the segment file 121 illustrated in FIG. 3 illustrates a state in which N media segments are included. The initialization segment is initialization information of decoding processing or the like. The media segment is information obtained by dividing media such as an audio object and the like in units of segments.

Figure 4:
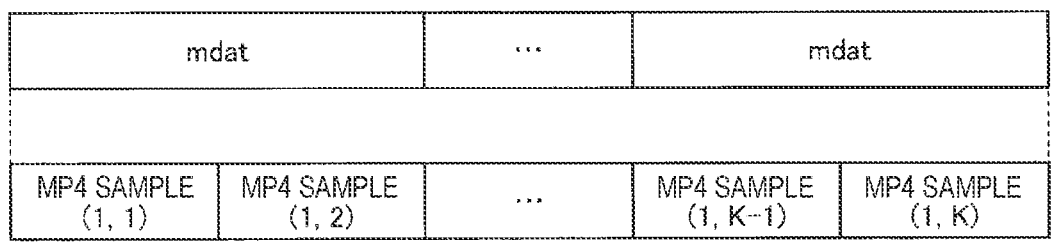
FIG. 4 is a diagram illustrating a data configuration example of a media segment according to the first embodiment of the present disclosure.

Here, FIG. 4 is a diagram illustrating a data configuration example of the media segment according to the first embodiment. The media segment shown in FIG. 4 shows a media segment (1) of FIG. 3. The media segment has data called MP4 samples obtained by subdividing the media segment. Then, the media segment illustrated in FIG. 4 illustrates a state of including K MP4 samples.

Figure 5:
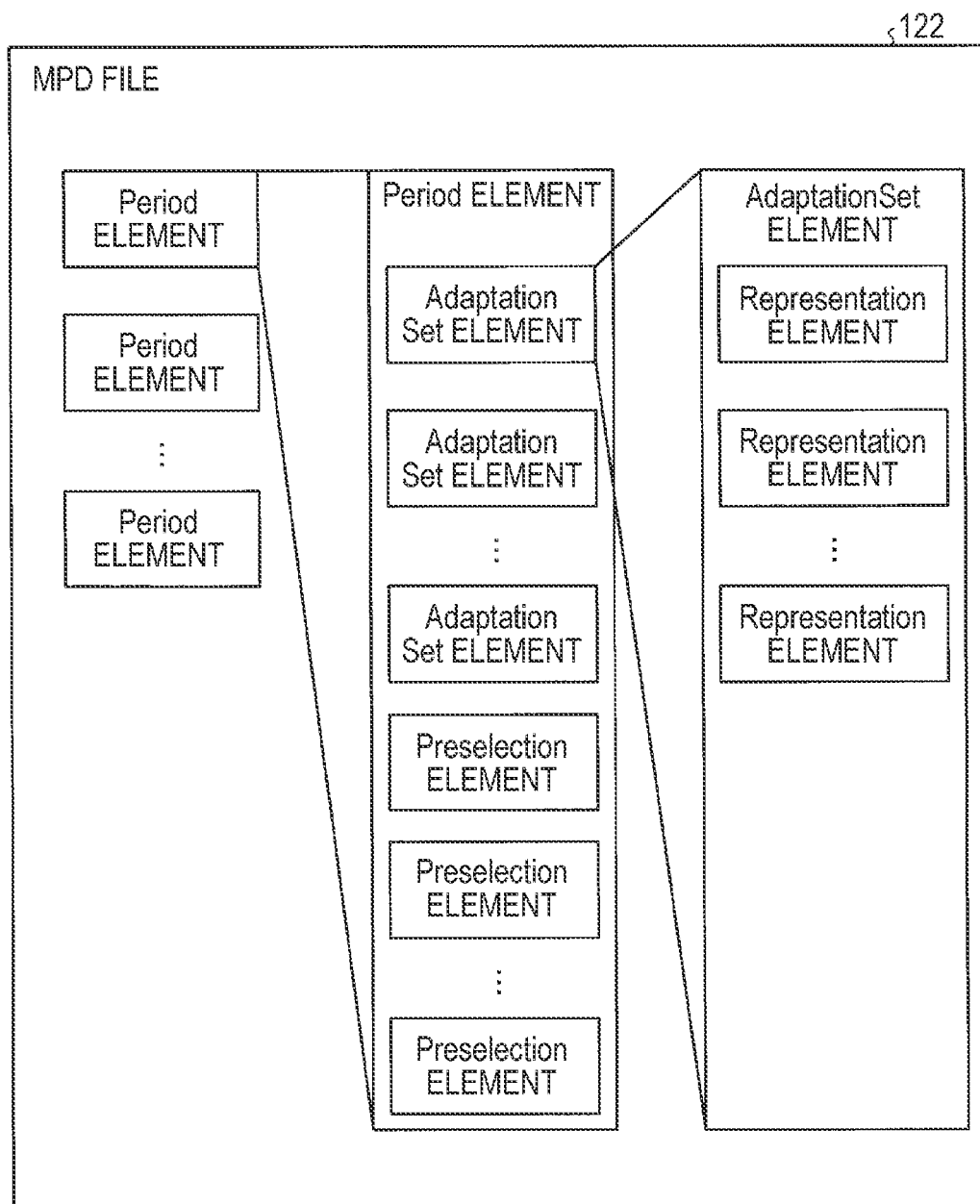
FIG. 5 is a diagram illustrating a data configuration example of an MPD file according to the first embodiment of the present disclosure.

Returning to FIG. 2, the MPD file 122 is a file in which information necessary for streaming reproduction is described in an extensible markup language (XML) format. Here, FIG. 5 is a diagram illustrating a data configuration example of the MPD file 122 according to the first embodiment. The MPD file 122 includes one or a plurality of Period elements. In the Period element, information in units of programs, content, and the like is described. Furthermore, the Period element includes one or a plurality of AdaptationSet elements.

Media types such as video, audio, text, and the like are described in the AdaptationSet element. Furthermore, information of different uses such as subtitles, dubbing, and the like may be described in the AdaptationSet element. Furthermore, the AdaptationSet element includes one or a plurality of Representation elements. In the Representation element, information such as a codec of a moving image and audio, a bit rate, a resolution of a moving image, and the like is described. Furthermore, a storage location of the segment file 121 and the like are described in the Representation element.

Furthermore, the Period element includes one or a plurality of preselection elements. In the preselection element, a group to which the segment file 121 belongs is described. More specifically, a group to which the segment file 121 indicated by the Representation element enumerated in a preselectionComponents attribute belongs is described in the preselection element.

Figure 6:
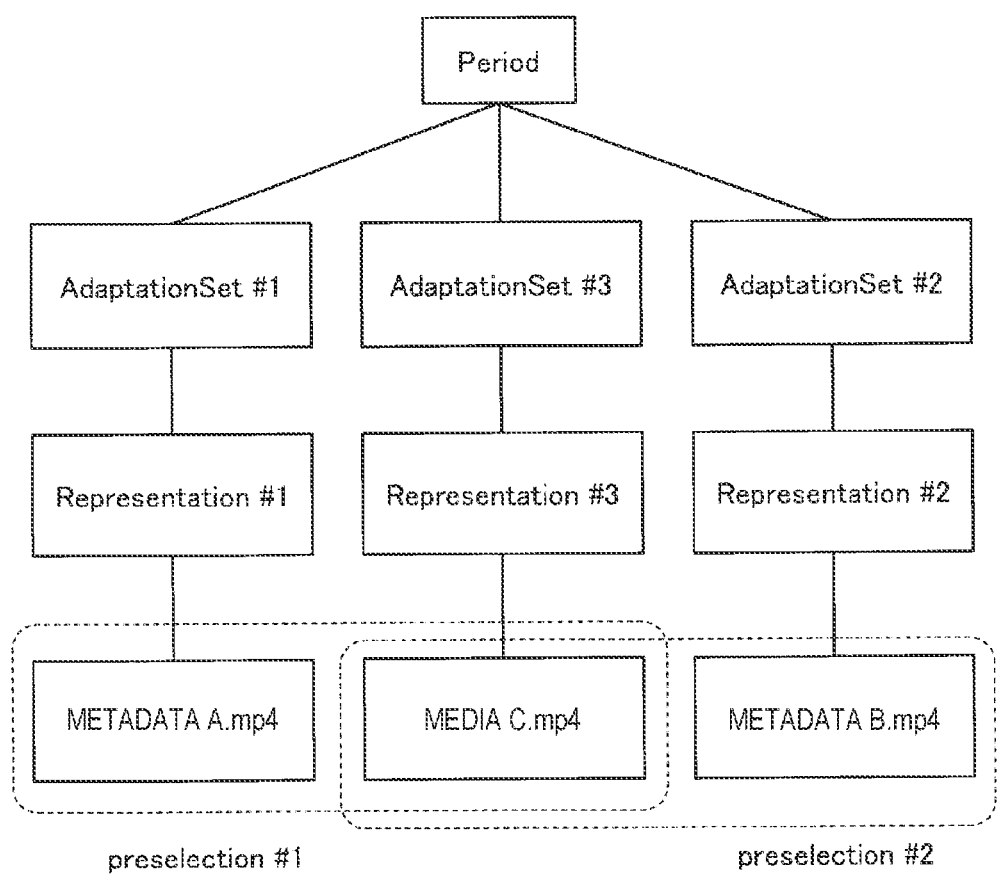
FIG. 6 is a diagram for describing an example of a group of the segment file of the present disclosure.

Here, FIG. 6 is a diagram for describing an example of the group of the segment file 121. A Period element illustrated in FIG. 6 includes three AdaptationSet elements. Furthermore, each AdaptationSet element includes a Representation element. Then, in the Representation element, the segment file 121 constituting the content is indicated.

A preselection element with an ID attribute "1" indicates that "metadata A.mp4" having metadata and "media C.mp4" having an audio object are grouped. Furthermore, a preselection element with an ID attribute "2" indicates that "metadata B.mp4" having metadata and "media C.mp4" having an audio object are grouped. In other words, "media C.mp4" indicates that it is shared by both the groups. Note that, hereinafter, appearance order of the preselection element described in the MPD file 122 is referred to as group information. Furthermore, the appearance order of the Representation element described in the MPD file 122 is referred to as a bit stream number.

Returning to FIG. 2, the control unit 13 integrally controls operation of the server device 10. For example, the control unit 13 is realized by a processor such as a central processing unit (CPU), a micro processing unit (MPU), and the like. For example, the control unit 13 realizes various functions by executing various programs stored in the storage unit and the like using a random access memory (RAM) and the like as a work area. Note that the control unit 13 may be realized by an integrated circuit such as an application specific integrated circuit (ASIC), a field programmable gate array (FPGA), and the like.

The control unit 13 includes, for example, a communication control unit 131 and a generation unit 132.

The communication control unit 131 controls the communication unit 11 to execute communication with the client device 20.

The generation unit 132 generates information according to a request received by the communication control unit 131 from the client device 20. Then, the generation unit 132 causes the communication control unit 131 to transmit the generated information. For example, the generation unit 132 causes the communication control unit 131 to transmit the MPD file 122 and the segment file 121.

Configuration of Client Device 20 According to First Embodiment

Figure 7:
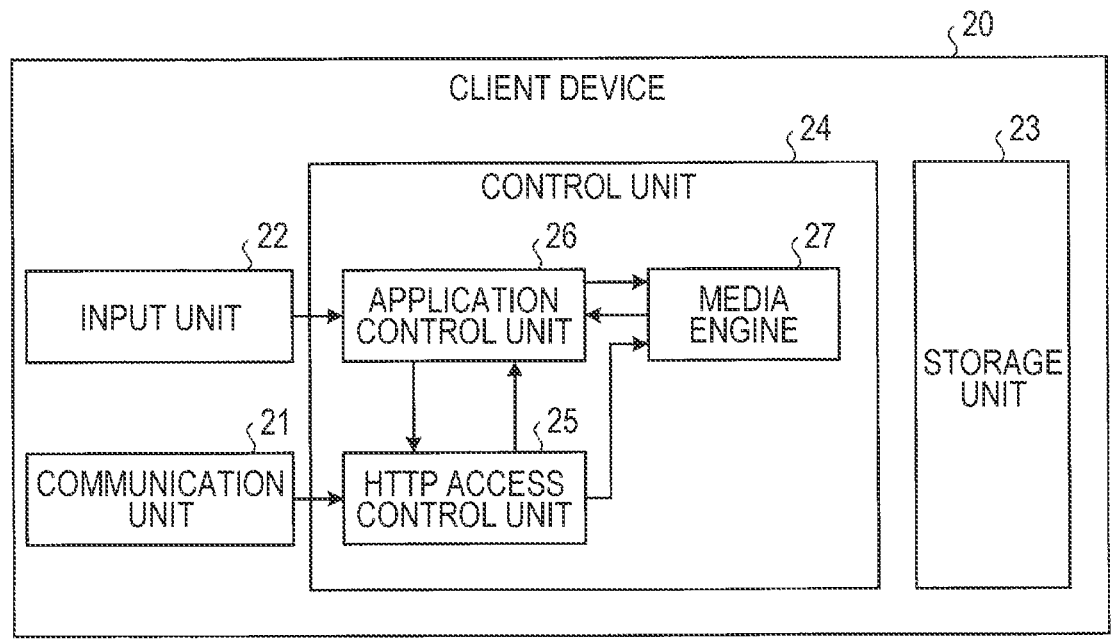
FIG. 7 is a diagram illustrating a configuration example of a client device according to the first embodiment of the present disclosure.

FIG. 7 is a diagram illustrating a configuration example of the client device 20 according to the first embodiment. The client device 20 includes a communication unit 21, an input unit 22, a storage unit 23, and a control unit 24.

The communication unit 21 is realized by, for example, an NIC and the like. The communication unit 21 transmits and receives information to and from the client device 20 via the network.

The input unit 22 is an input device that accepts an operation from a user. For example, the input unit 22 accepts a switching operation of a content group.

The storage unit 23 is realized by, for example, a semiconductor memory element such as a RAM, a flash memory, and the like, or a storage device such as a hard disk, an optical disk, and the like.

The control unit 24 integrally controls operation of the client device 20. For example, the control unit 24 is realized by a processor such as a CPU, an MPU, and the like. For example, the control unit 24 realizes various functions by executing various programs stored in a storage unit and the like using a RAM and the like as a work area. Note that the control unit 24 may be realized by an integrated circuit such as an ASIC, an FPGA, and the like.

The control unit 24 includes, for example, an HTTP access control unit 25, an application control unit 26, and a media engine 27.

The HTTP access control unit 25 controls the communication unit 21 to execute communication conforming to the HTTP protocol. For example, the HTTP access control unit 25 receives the MPD file 122 and the segment file 121. Furthermore, in a case where the MPD file 122 is received, the HTTP access control unit 25 outputs the MPD file 122 to the application control unit 26. Furthermore, in a case where the segment file 121 is received, the HTTP access control unit 25 outputs the initialization segment to the application control unit 26.

Figure 8:
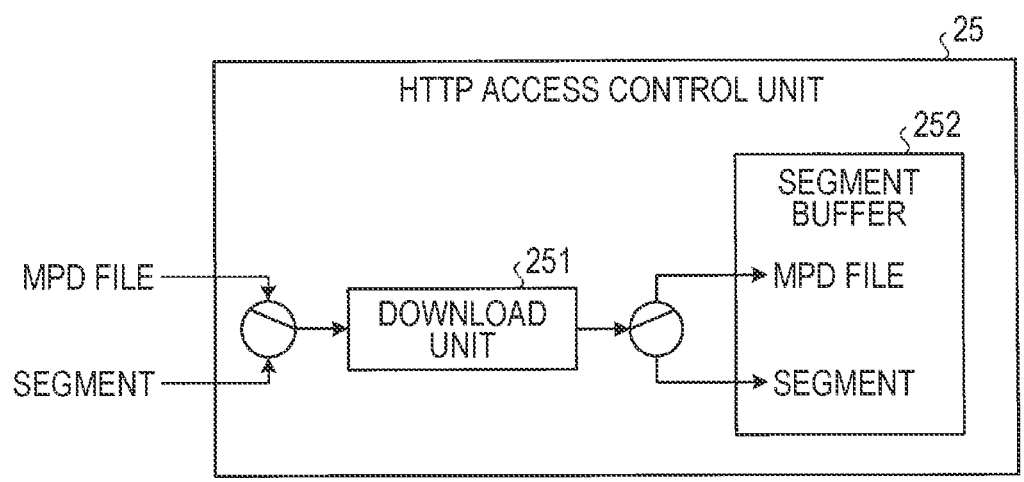
FIG. 8 is a diagram illustrating a configuration example of an HTTP access control unit according to the first embodiment of the present disclosure.

Furthermore, in a case where a segment such as the media segment is received, the HTTP access control unit 25 stores the received segment in a segment buffer 252 (see FIG. 8). At this time, segment attribute information as described later is added and stored in the segment buffer 252 (see FIG. 8) by the HTTP access control unit 25.

Furthermore, the HTTP access control unit 25 outputs the segment attribute information stored in the segment buffer 252 (see FIG. 8) to the application control unit 26. Moreover, the HTTP access control unit 25 outputs the segment to which the segment attribute information stored in the segment buffer 252 (see FIG. 8) is added to the media engine 27.

The application control unit 26 controls the input unit 22 to accept a controlling operation of streaming reproduction. For example, the application control unit 26 accepts operations such as start of streaming reproduction, stop of streaming reproduction, switching of a content group, and the like. Furthermore, in a case where the switching operation of the content group is accepted, the application control unit 26 specifies a switching position (output time, a segment number, an MP4 sample number, and a bit stream number). Note that there is a case where the segment number and the MP4 sample number of the switching position are different for every bit stream, and therefore the bit stream number is also required.

Figure 10:
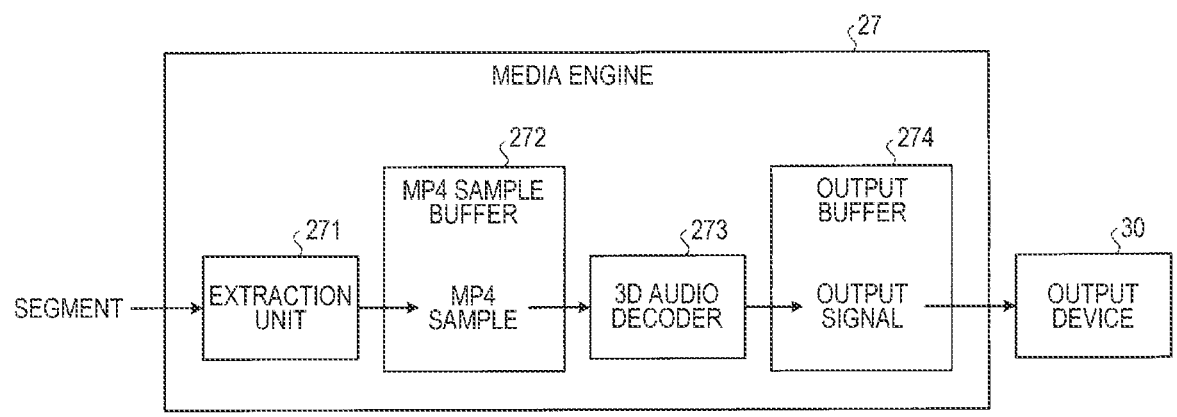
FIG. 10 is a diagram illustrating a configuration example of a media engine according to the first embodiment of the present disclosure.

Furthermore, in a case where the HTTP access control unit 25 receives the MPD file 122, the application control unit 26 extracts initialization information from the initialization segment specified in the MPD file 122 and initializes a 3D audio decoder 273 (see FIG. 10).

Furthermore, the application control unit 26 selects the segment file 121 to be downloaded from the MPD file 122. Furthermore, the application control unit 26 reads the preselection element from the MPD file 122 and groups the bit streams of the segment file 121.

The media engine 27 outputs an output signal obtained by decoding the segment output from the HTTP access control unit 25 to the output device 30. Furthermore, the media engine 27 outputs MP4 sample attribute information added to the MP4 sample stored in an MP4 sample buffer 272 (see FIG. 8) to the application control unit 26.

Configuration of HTTP Access Control Unit 25 According to First Embodiment

FIG. 8 is a diagram illustrating a configuration example of the HTTP access control unit 25 according to the first embodiment. The HTTP access control unit 25 includes the segment buffer 252 and a download unit 251.

The segment buffer 252 stores a bit stream of the segment file 121 in units of segments.

The download unit 251 receives the segment file 121 having a plurality of segments and the MPD file 122 such as a setting file in which a group to which the segment file 121 belongs is set and the like by communication conforming to the HTTP protocol. More specifically, the download unit 251 transmits a transmission request of the MPD file 122 and the segment file 121 to be reproduced to the server device 10. The download unit 251 receives the MPD file 122 from the server device 10. Then, the download unit 251 stores the MPD file 122 received from the server device 10 in the segment buffer 252.

Furthermore, the download unit 251 receives the segment file 121 indicated by the MPD file 122 from the server device 10. Then, in a case where the segment file 121 is received, the download unit 251 stores it in the segment buffer 252 in units of segments. At this time, in a case where a target to be stored in the segment buffer 252 is the media segment, the download unit 251 sets a header region for the segment. Then, the download unit 251 adds segment attribute information to the header region and stored it in the segment buffer 252.

Furthermore, the download unit 251 alternately receives metadata and object data on the basis of an instruction from the application control unit 26. Then, the download unit 251 stores the received metadata and object data in the segment file 121.

Here, FIG. 9 is a diagram illustrating a data configuration example of a segment stored in the segment buffer 252 according to the first embodiment. The segment attribute information includes group information, a bit stream number, a segment number, output time, and Usage data.

The group information is information indicating a number of a group to which the segment belongs. As the group information, a serial number in which a preselection element appears in the MPD file 122 is set.

The bit stream number is information indicating a number of a bit stream of the segment file 121 including the segment. As the bit stream number, a serial number in which a Representation element appears in the MPD file 122 is set. Furthermore, the bit stream number is used to determine identity of the bit stream. Note that the bit stream number may be a uniform resource locator (URL) of the bit stream, but is preferably a numerical value because it is easier to process than comparing URLs.

The segment number is information indicating a serial number of the segment from the head in the bit stream. Note that, in a case where a segment to be recorded is the initialization segment, 0xFFFFFFFF is set as the segment number of the segment attribute information.

The output time is information indicating output start time of the segment. As the output time, a value of baseMediaDecodeTime of the head moof box included in the media segment is set. In other words, the output time is a reproduction start time indicating a time at which reproduction of a target segment is started in content.

The Usage data is information indicating usage of data included in the MP4 sample. As the Usage data, a numerical value is added to a codecs attribute of the Representation element of the MPD file 122, and this numerical value is set. In a case where the Usage data is 0, an audio object and metadata are extracted from the MP4 sample. In a case where the Usage data is 1, the audio object is extracted from the MP4 sample. In other words, in a case where the audio object and the metadata are included in the MP4 sample, the metadata is discarded. In a case where the Usage data is 2, the metadata is extracted from the MP4 sample. In other words, in a case where the audio object and the metadata are included in the MP4 sample, the audio object is discarded. Note that, in a case where the segment to be recorded is the initialization segment, 0xFF is set as the Usage data.

Configuration of Media Engine 27 According to First Embodiment

FIG. 10 is a diagram illustrating a configuration example of the media engine 27 according to the first embodiment. The media engine 27 includes the MP4 sample buffer 272, an output buffer 274, an extraction unit 271, and the 3D audio decoder 273.

The MP4 sample buffer 272 stores an MP4 sample output from the extraction unit 271. The output buffer 274 stores an output signal output from the 3D audio decoder 273.

The extraction unit 271 extracts one or more MP4 samples included in the segment of the bit stream of the segment file 121 received by the download unit 251, and adds MP4 sample attribute information including a reproduction start time of the MP4 sample to the MP4 sample in demultiplexing processing. More specifically, the extraction unit 271 extracts an MP4 sample of an audio object from a segment of an audio object stored in the segment buffer 252. Furthermore, the extraction unit 271 sets a header region for the MP4 sample. Then, the extraction unit 271 adds the MP4 sample attribute information to the header region and stored it in the MP4 sample buffer 272.

Here, FIG. 11 is a diagram illustrating a data configuration example of the MP4 sample stored in the MP4 sample buffer 272 according to the first embodiment. The MP4 sample attribute information includes group information, a bit stream number, a segment number, an MP4 sample number, Usage data, and an output time.

As the group information, group information acquired from the segment attribute information of the segment to which the MP4 sample belongs is set. As the bit stream number, a bit stream number acquired from the segment attribute information of the segment to which the MP4 sample belongs is set. As the segment number, a segment number acquired from the segment attribute information of the segment to which the MP4 sample belongs is set. As the MP4 sample number, a serial number in which a target MP4 sample appears in the segment to which the MP4 sample belongs is set. Note that, in a case of fragmented MP4, a serial number (index) in a segment across a plurality of moof boxes is set as the MP4 sample number. As the Usage data, Usage data acquired from the segment attribute information of the segment to which the MP4 sample belongs is set. As the output time, a value of Composition Time of the target MP4 sample is set. In other words, the output time is a reproduction start time indicating a time at which reproduction of the target MP4 sample is started in the content.

In a case where an MP4 sample of an audio object and an MP4 sample of metadata are input one by one, the 3D audio decoder 273 generates an output signal (PCM signal for an output channel). At this time, the 3D audio decoder 273 accepts an MP4 sample to which Usage data of MP4 sample attribute information is added.

In analysis processing, the 3D audio decoder 273 extracts desired data designated by the Usage data from the input MP4 sample. In other words, the 3D audio decoder 273 extracts the audio object, the metadata, or both the audio object and the metadata on the basis of the Usage data. Therefore, the 3D audio decoder 273 can eliminate redundancy of selecting only desired data after executing both decoding of the audio object and decoding of the metadata. Then, the 3D audio decoder 273 aligns the generated output signals in order of the output time and stored them in the output buffer 274.

Configuration of 3D Audio Decoder 273 According to First Embodiment

Figure 12:
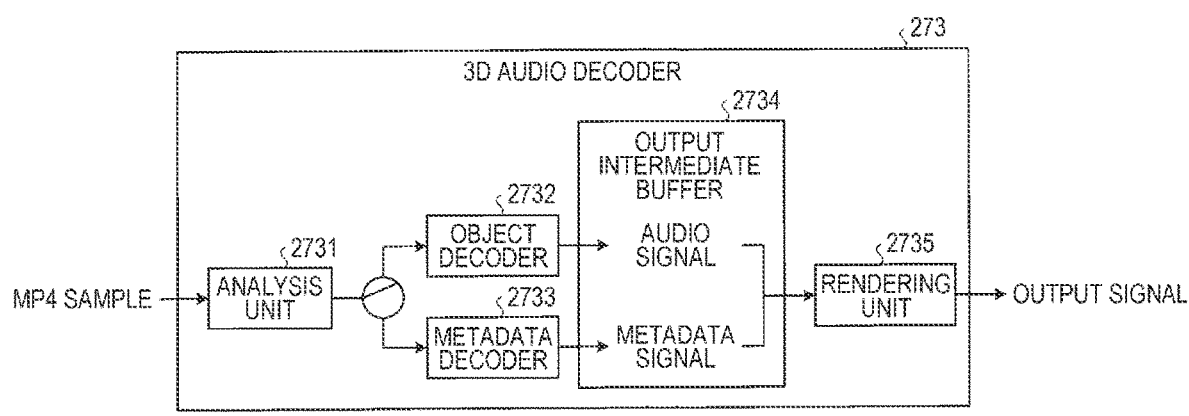
FIG. 12 is a diagram illustrating a configuration example of a 3D audio decoder according to the first embodiment of the present disclosure.

FIG. 12 is a diagram illustrating a configuration example of the 3D audio decoder 273 according to the first embodiment. The 3D audio decoder 273 includes an output intermediate buffer 2734, an analysis unit 2731, an object decoder 2732, a metadata decoder 2733, and a rendering unit 2735.

The output intermediate buffer 2734 stores decoded audio data and decoded metadata.

The analysis unit 2731 analyzes whether or not an audio object or metadata is included in the MP4 sample acquired from the MP4 sample buffer 272. Furthermore, the analysis unit 2731 separates the MP4 sample into object data and metadata accompanying the object data. In other words, the analysis unit 2731 separates the MP4 sample into audio object data as the object data and localization information of the audio object as the metadata. Then, the analysis unit 2731 specifies an output destination of the data included in the MP4 sample on the basis of the Usage data of the MP4 sample attribute information.

More specifically, in a case where "0" is set to the Usage data, the analysis unit 2731 outputs the audio object included in the MP4 sample to the object decoder 2732, and outputs the metadata included in the MP4 sample to the metadata decoder 2733. Furthermore, in a case where "1" is set to the Usage data, the analysis unit 2731 outputs the audio object included in the MP4 sample to the object decoder 2732. Note that even if the metadata is included in the MP4 sample, the analysis unit 2731 discards the metadata without outputting it to the metadata decoder 2733. Furthermore, in a case where "2" is set to the Usage data, the analysis unit 2731 outputs the metadata included in the MP4 sample to the metadata decoder 2733. Note that even if the audio object is included in the MP4 sample, the analysis unit 2731 discards the audio object without outputting it to the object decoder 2732.

The object decoder 2732 decodes the audio object. The object decoder 2732 stores an audio signal obtained by decoding in the output intermediate buffer 2734.

The metadata decoder 2733 decodes the metadata. The metadata decoder 2733 stores a metadata signal obtained by decoding in the output intermediate buffer 2734.

In a case where the audio signal and the metadata signal having the same output time in the content are stored in the output intermediate buffer 2734, the rendering unit 2735 generates an output signal from the audio signal and the metadata signal having the same output time. The rendering unit 2735 sets a header region for the generated output signal. Furthermore, the rendering unit 2735 adds output signal attribute information to the header region. Then, the rendering unit 2735 arranges the output signals to which the output signal attribute information is added in order of the output time in the content and stored them in the output buffer 274. Moreover, the rendering unit 2735 outputs the output signals arranged in the output buffer 274 in order of the output time to the output device 30 at predetermined time.

Here, FIG. 13 is a diagram illustrating a data configuration example of the output signal stored in the output buffer 274 according to the first embodiment. The output signal attribute information includes group information and output time. Group information acquired from MP4 sample attribute information of an MP4 sample from which the output signal has been generated is set as the group information. Output time acquired from the MP4 sample attribute information of the MP4 sample from which the output signal has been generated is set as the output time. In other words, the output time is a reproduction start time indicating a time at which reproduction of a target output signal is started in the content.

Streaming Reproduction Processing Procedure According to First Embodiment

Figure 14:
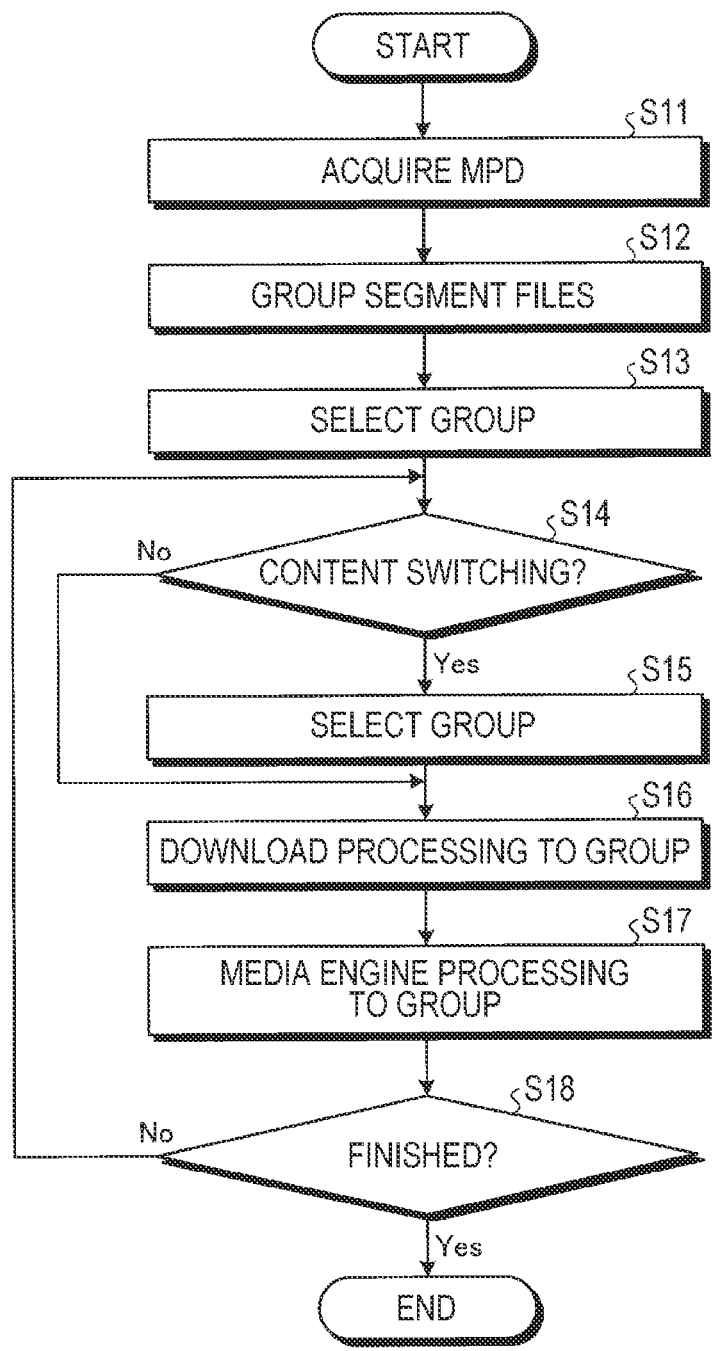
FIG. 14 is a flowchart illustrating an example of streaming reproduction processing executed by the client device according to the first embodiment of the present disclosure.

Next, streaming reproduction processing executed by the client device 20 according to the first embodiment will be described. FIG. 14 is a flowchart illustrating an example of the streaming reproduction processing executed by the client device 20 according to the first embodiment.

The HTTP access control unit 25 acquires the MPD file 122 of the content specified by an operation of a user from the server device 10 (step S11).

The application control unit 26 groups the segment files 121 on the basis of setting described in the MPD file 122 (step S12).

The application control unit 26 selects a group according to an operation accepted by the input unit 22 (step S13).

The application control unit 26 determines whether or not a switching operation of a content group has been accepted (step S14). In a case where the switching operation has not been accepted (step S14; No), the client device 20 proceeds to step S16.

In a case where the switching operation has been accepted (step S14; Yes), the application control unit 26 selects a group according to the operation (step S15).

The HTTP access control unit 25 executes download processing of the segment file 121 of the selected group by communication conforming to the HTTP protocol (step S16).

The media engine 27 executes media engine processing of executing demultiplexing processing, decoding processing, and reproduction of a bit stream acquired by downloading the segment file 121 (step S17).

The application control unit 26 determines whether or not a streaming reproduction end condition is satisfied (step S18). For example, the application control unit 26 determines that the streaming reproduction end condition is satisfied in a case where a last segment of all the segment files 121 in the selected group is reproduced, in a case where an operation to end the streaming reproduction is accepted, and the like.

In a case where the streaming reproduction is continued (step S18; No), the client device 20 proceeds to step S14.

In a case where the streaming reproduction end condition is satisfied (step S18; Yes), the client device 20 ends the streaming reproduction processing.

As described above, the client device 20 ends the streaming reproduction processing.

Download Processing Procedure According to First Embodiment

Figure 15:
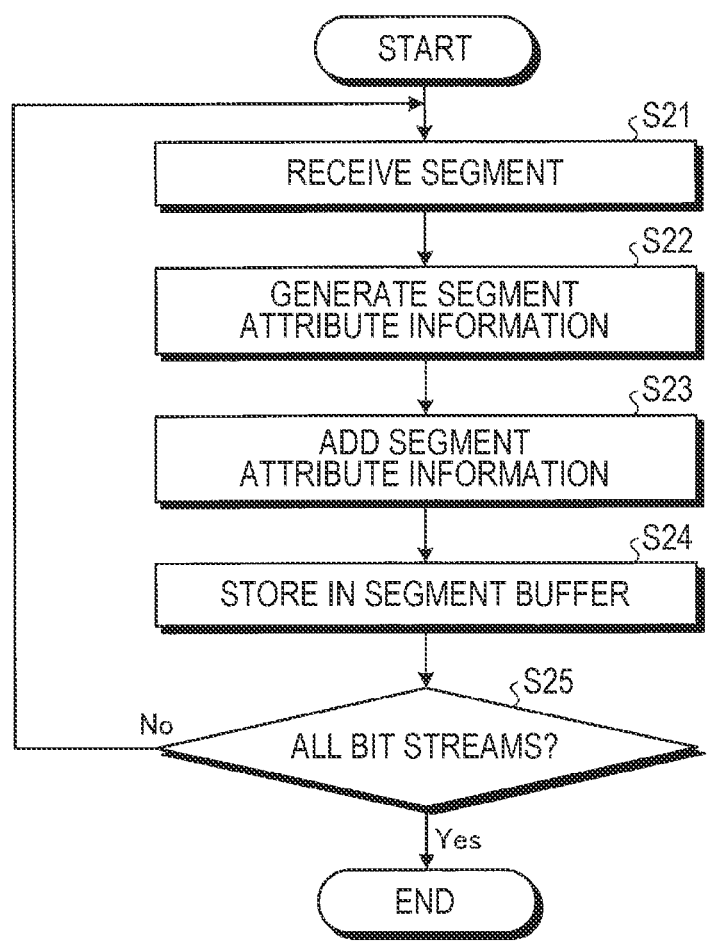
FIG. 15 is a flowchart illustrating an example of download processing executed by the HTTP access control unit according to the first embodiment of the present disclosure.

Next, download processing executed by the HTTP access control unit 25 according to the first embodiment will be described. FIG. 15 is a flowchart illustrating an example of the download processing executed by the HTTP access control unit 25 according to the first embodiment.

The download unit 251 receives a segment included in the bit stream of the segment file 121 (step S21).

The download unit 251 generates segment attribute information corresponding to the received segment (step S22).

The download unit 251 adds the generated segment attribute information to the received segment (step S23).

The download unit 251 stores the segment to which the segment attribute information is added in the segment buffer 252 (step S24).

The download unit 251 determines whether or not the processing has been executed on the bit streams of all the segment files 121 belonging to the selected group (step S25). In a case where the processing has not been executed on the bit streams of all the segment files 121 (step S25; No), the HTTP access control unit 25 proceeds to step S21.

In a case where the processing has been executed on the bit streams of all the segment files 121 (step S25; Yes), the HTTP access control unit 25 ends the download processing.

As described above, the HTTP access control unit 25 ends the download processing.

Media Engine Processing Procedure According to First Embodiment

Figure 16:
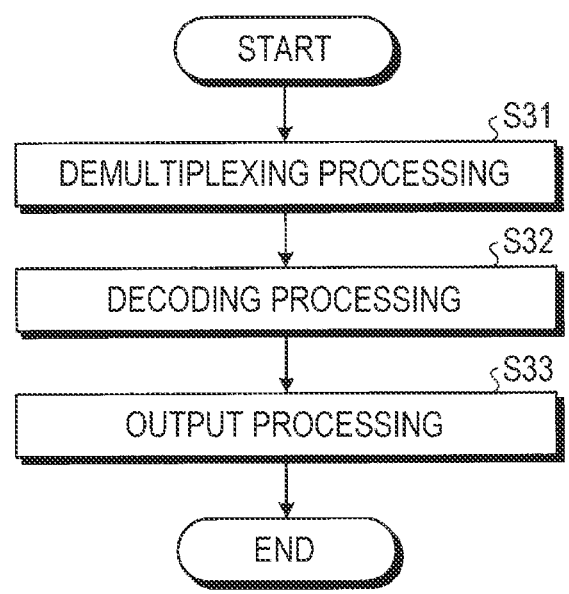
FIG. 16 is a flowchart illustrating an example of media engine processing executed by the media engine according to the first embodiment of the present disclosure.

Next, media engine processing executed by the media engine 27 according to the first embodiment will be described. FIG. 16 is a flowchart illustrating an example of the media engine processing executed by the media engine 27 according to the first embodiment.

The extraction unit 271 performs demultiplexing processing (step S31).

The 3D audio decoder 273 executes decoding processing (step S32).

The rendering unit 2735 executes output processing (step S33). In other words, the rendering unit 2735 outputs an output signal stored in the output buffer 274 to the output device 30. Then, the output device 30 outputs audio indicated by the output signal.

Thus, the media engine 27 ends the media engine processing.

Demultiplexing Processing Procedure According to First Embodiment

Figure 17:
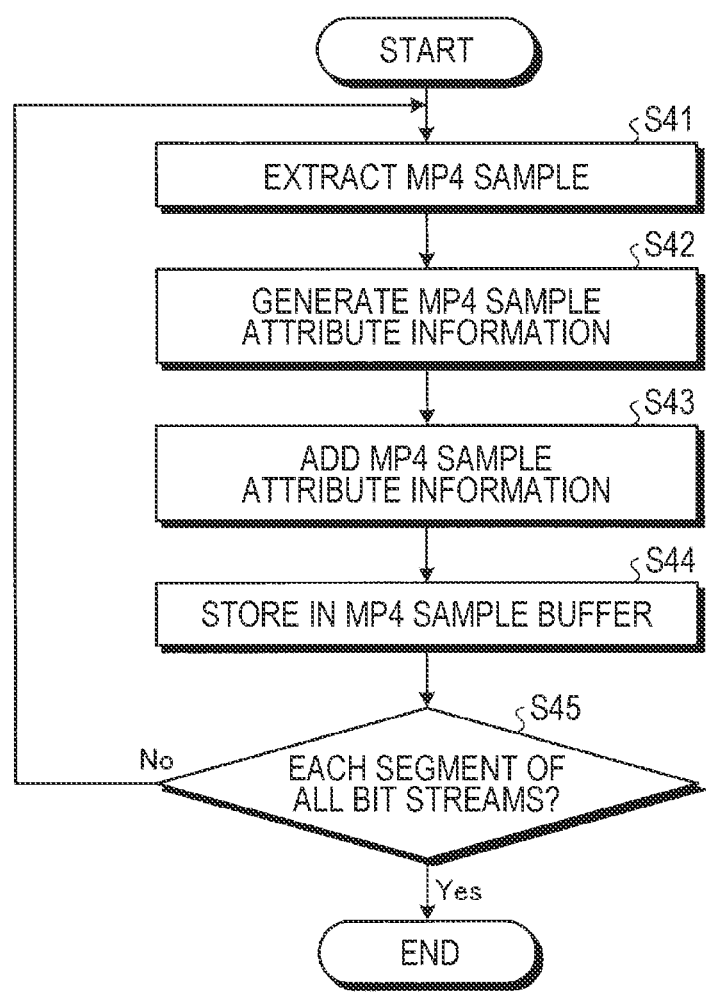
FIG. 17 is a flowchart illustrating an example of demultiplexing processing executed by an extraction unit according to the first embodiment of the present disclosure.

Next, demultiplexing processing executed by the extraction unit 271 according to the first embodiment will be described. FIG. 17 is a flowchart illustrating an example of the demultiplexing processing executed by the extraction unit 271 according to the first embodiment.

The extraction unit 271 extracts an MP4 sample from the segment acquired from the segment buffer 252 (step S41).

The extraction unit 271 generates MP4 sample attribute information corresponding to the extracted MP4 sample (step S42).

The extraction unit 271 adds the generated MP4 sample attribute information to the extracted MP4 sample (step S43).

The extraction unit 271 stores the MP4 sample to which the MP4 sample attribute information is added in the MP4 sample buffer 272 (step S44).

The extraction unit 271 determines whether or not the processing has been executed on each segment of the bit streams of all the segment files 121 belonging to the selected group (step S45). In a case where the processing has not been executed on each segment of the bit streams of all the segment files 121 (step S45; No), the extraction unit 271 proceeds to step S41.

In a case where the processing has been executed on each segment of the bit streams of all the segment files 121 (step S45; Yes), the extraction unit 271 ends the demultiplexing processing.

Thus, the extraction unit 271 ends the demultiplexing processing.

Decoding Processing Procedure According to First Embodiment

Figure 18:
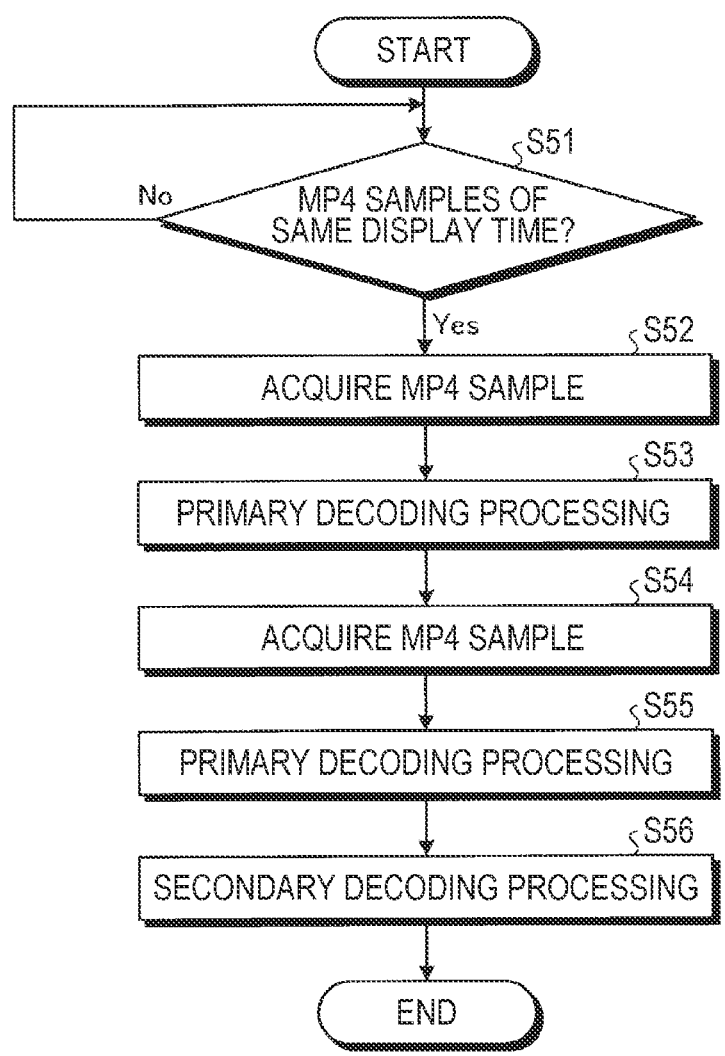
FIG. 18 is a flowchart illustrating an example of decoding processing executed by the extraction unit according to the first embodiment of the present disclosure.

Next, demultiplexing processing executed by the extraction unit 271 according to the first embodiment will be described. FIG. 18 is a flowchart illustrating an example of the decoding processing executed by the extraction unit 271 according to the first embodiment.

The 3D audio decoder 273 determines whether or not two MP4 samples having the same output time are stored in the MP4 sample buffer 272 (step S51). In other words, the 3D audio decoder 273 determines whether or not the MP4 samples having the audio object and the metadata are stored in the MP4 sample buffer 272. In a case where the two MP4 samples having the same output time are not stored in the MP4 sample buffer 272 (step S51; No), the 3D audio decoder 273 stands by.

In a case where the two MP4 samples having the same output time are stored in the MP4 sample buffer 272 (step S51; Yes), the 3D audio decoder 273 acquires one MP4 sample of the two MP4 samples having the same output time (step S52).

The 3D audio decoder 273 performs primary decoding processing on the acquired MP4 sample (step S53).

The 3D audio decoder 273 acquires another MP4 sample which has not been acquired in step S52 out of the two MP4 samples of the same output time (step S54).

The 3D audio decoder 273 performs the primary decoding processing on the acquired MP4 sample (step S55).

The 3D audio decoder 273 executes secondary decoding processing (step S56).

As described above, the 3D audio decoder 273 ends the decoding processing.

Primary Decoding Processing Procedure According to First Embodiment

Figure 19:
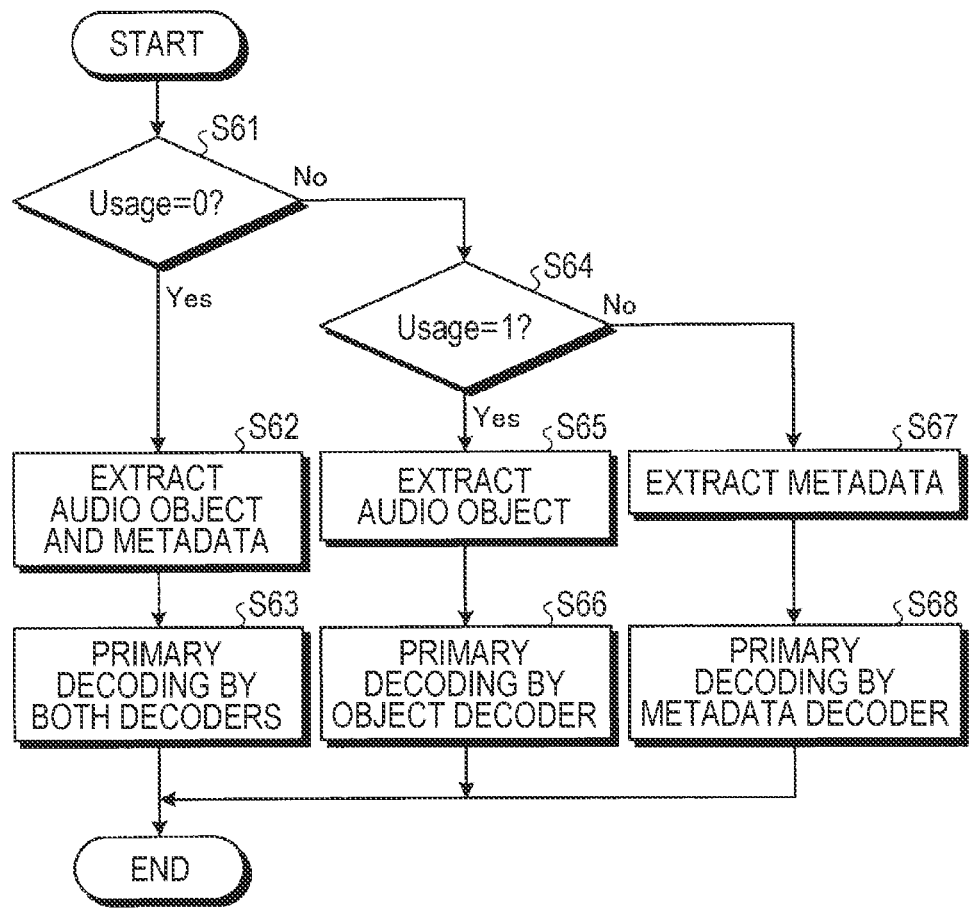
FIG. 19 is a flowchart illustrating an example of primary decoding processing executed by the 3D audio decoder according to the first embodiment of the present disclosure.

Next, primary decoding processing executed by the 3D audio decoder 273 according to the first embodiment will be described. FIG. 19 is a flowchart illustrating an example of the primary decoding processing executed by the 3D audio decoder 273 according to the first embodiment.

The analysis unit 2731 determines whether or not Usage of the MP4 sample attribute information of the acquired MP4 sample is "0" (step S61). In a case where Usage of the MP4 sample attribute information is "0" (step S61; Yes), the analysis unit 2731 extracts the audio object and the metadata from the MP4 sample (step S62).

The object decoder 2732 and the metadata decoder 2733 execute primary decoding on the audio object and the metadata extracted from the MP4 sample (step S63). In other words, the object decoder 2732 executes the primary decoding on the audio object extracted from the MP4 sample. Then, the object decoder 2732 stores an audio signal generated by the primary decoding in the output intermediate buffer 2734. Furthermore, the metadata decoder 2733 performs the primary decoding on the metadata extracted from the MP4 sample. Then, the metadata decoder 2733 stores a metadata signal generated by the primary decoding in the output intermediate buffer 2734.

In a case where Usage of the MP4 sample attribute information is not "0" (step S61; No), the analysis unit 2731 determines whether or not Usage of the MP4 sample attribute information is "1" (step S64). In a case where Usage of the MP4 sample attribute information is "1" (step S64; Yes), the analysis unit 2731 extracts the audio object from the MP4 sample (step S65). At this time, in a case where the metadata is included in the MP4 sample, the analysis unit 2731 discards the metadata.

The object decoder 2732 executes primary decoding on the audio object extracted from the MP4 sample (step S66). Then, the object decoder 2732 stores an audio signal generated by the primary decoding in the output intermediate buffer 2734.

In a case where Usage of the MP4 sample attribute information is not "1" (step S64; No), the analysis unit 2731 determines that Usage of the MP4 sample attribute information is "2", and extracts the metadata from the MP4 sample (step S67).

The metadata decoder 2733 performs primary decoding on the metadata extracted from the MP4 sample (step S68). Then, the metadata decoder 2733 stores a metadata signal generated by the primary decoding in the output intermediate buffer 2734.

As described above, the 3D audio decoder 273 ends the primary decoding processing.

Secondary Decoding Processing Procedure According to First Embodiment

Figure 20:
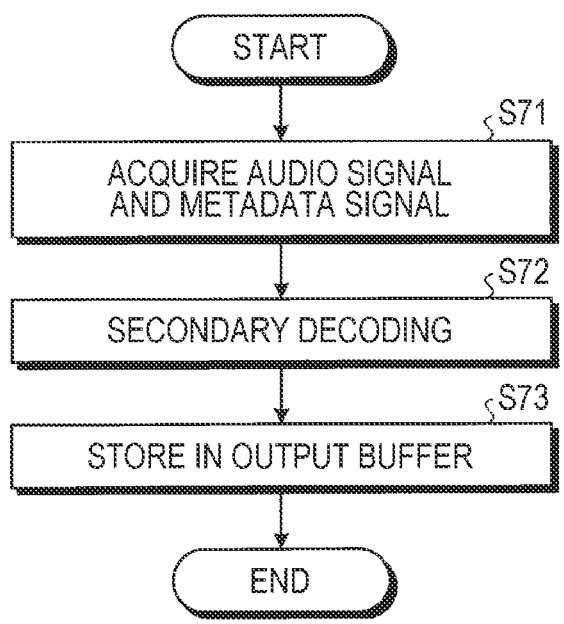
FIG. 20 is a flowchart illustrating an example of secondary decoding processing executed by the 3D audio decoder according to the first embodiment of the present disclosure.

Next, secondary decoding processing executed by the 3D audio decoder 273 according to the first embodiment will be described. FIG. 20 is a flowchart illustrating an example of the secondary decoding processing executed by the 3D audio decoder 273 according to the first embodiment.

The rendering unit 2735 acquires the audio signal and the metadata signal of the same output time from the output intermediate buffer 2734 (step S71).

The rendering unit 2735 executes secondary decoding using the audio signal and the metadata signal of the same output time (step S72).

The rendering unit 2735 stores an output signal generated by the secondary decoding in the output buffer 274 (step S73).

As described above, the 3D audio decoder 273 ends the secondary decoding processing.

Content Group Switching Processing Procedure According to First Embodiment

Figure 21:
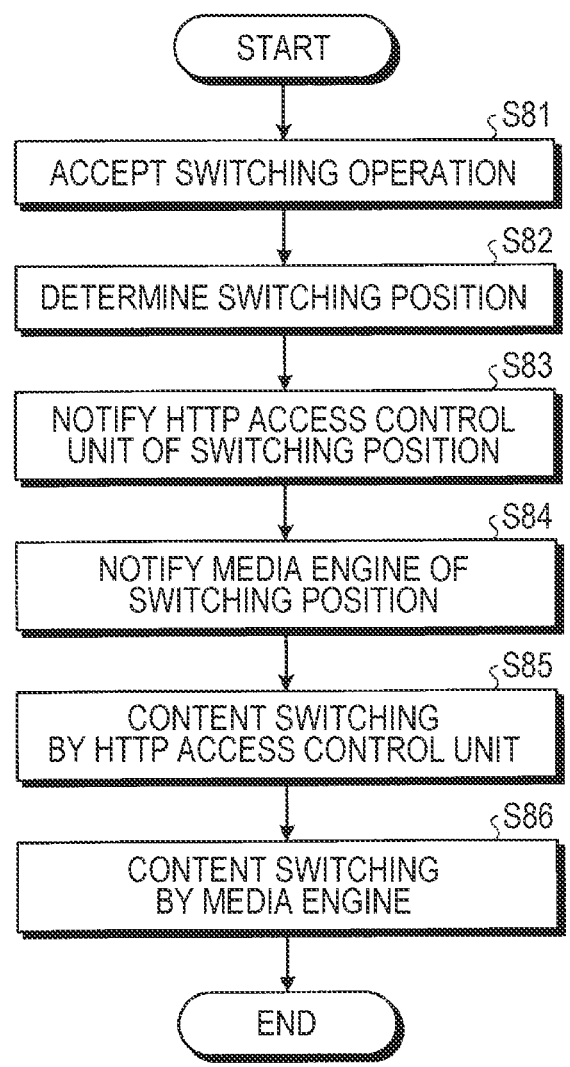
FIG. 21 is a flowchart illustrating an example of content group switching processing executed by the client device according to the first embodiment of the present disclosure.

Next, switching processing of switching a content group executed by the client device 20 according to the first embodiment will be described. FIG. 21 is a flowchart illustrating an example of content group switching processing executed by the client device 20 according to the first embodiment.

The application control unit 26 accepts a switching operation of the content group (step S81). For example, the switching operation of the content group is a switching operation of a viewing position, a switching operation of language of audio, and the like.

The application control unit 26 determines a position for switching the content group (step S82). Note that a method for determining the position for switching the content group will be described later.

The application control unit 26 notifies the HTTP access control unit 25 of a content switching position (step S83).

The application control unit 26 notifies the media engine 27 of the content switching position (step S84).

The HTTP access control unit 25 executes processing of switching the content group (step S85). In other words, the HTTP access control unit 25 downloads the segment file 121 of the group after the switching.

The media engine 27 executes processing of switching the content group (step S86). In other words, the media engine 27 performs demultiplexing processing, decoding processing, and output processing on the group after the switching.

As described above, the client device 20 ends the group switching processing.

Determination of Position for Switching Group According to First Embodiment

Determination of the position for switching the content group will be described. In a case where a user switches the content group, the client device 20 preferably reproduces the content group after the switching as early as possible. On the other hand, the client device 20 needs to prevent occurrence of an image sound gap. Here, the image sound gap means that reproduction of content is delayed because processing such as downloading of the content, decoding of the content, and the like is slow with respect to the reproduction of the content.

Therefore, the application control unit 26 determines a switching position where the segment file 121 belonging to the group after the switching is output in units of MP4 samples on the basis of the segment attribute information, the MP4 sample attribute information, and the output signal attribute information. More specifically, the application control unit 26 calculates a processing time required to start reproduction of the bit stream of the segment file 121 of the group after the switching, which has been accepted by the application control unit 26. The application control unit 26 determines the switching position on the basis of the processing time calculated by the application control unit 26. Specifically, the application control unit 26 calculates a time required to download the segment of the group after the switching, a time required to perform demultiplexing processing on the segment of the group after the switching, and a time required to decode the MP4 sample.

For example, the application control unit 26 downloads one segment for every bit stream of the group after the switching, performs the demultiplexing processing and the decoding processing on one MP4 sample of each segment, and obtains Tproc (seconds) indicating a total processing time until one output signal is output.

Figure 22:
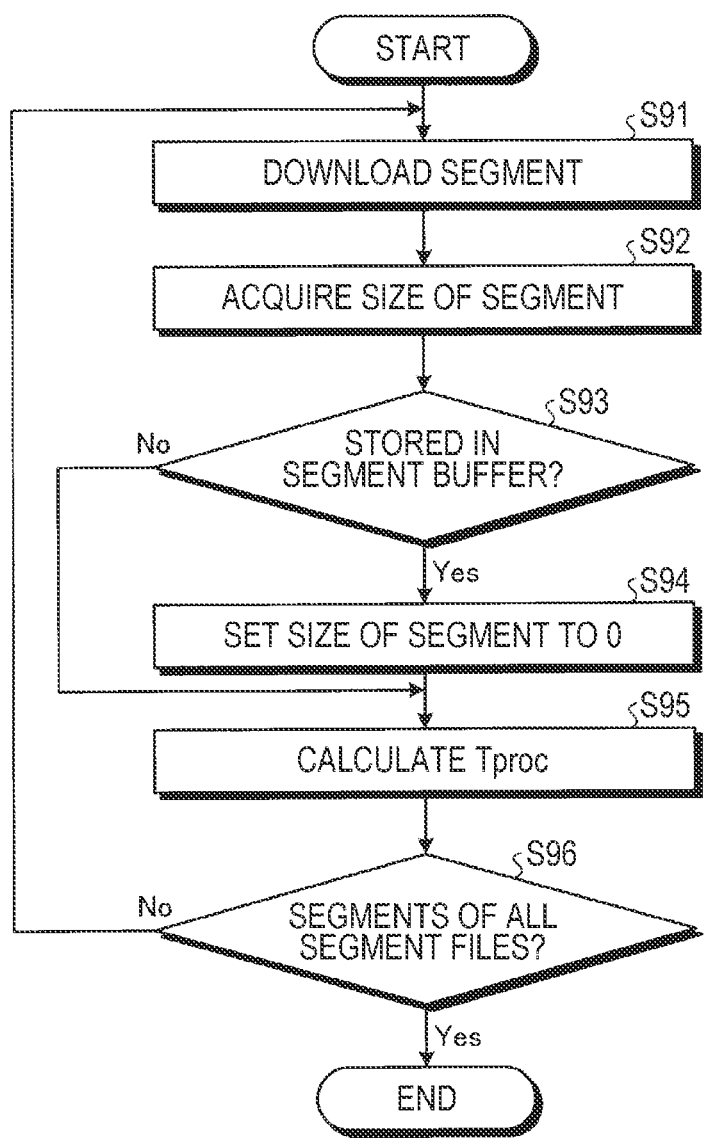
FIG. 22 is a flowchart illustrating an example of processing time calculation processing executed by the client device according to the first embodiment of the present disclosure.

Here, FIG. 22 is a flowchart illustrating an example of processing time calculation processing executed by the client device 20 according to the first embodiment.

The HTTP access control unit 25 receives one segment included in the bit stream of the segment file 121 belonging to the group after the switching (step S91).

The application control unit 26 acquires data size of the received segment (step S92).

The application control unit 26 determines whether or not the received segment has already been stored in the segment buffer 252 (step S93). In other words, the application control unit 26 determines whether or not the segment of the bit stream is common to the group before the switching and the group after switching.

In a case where the received segment has already been stored in the segment buffer 252 (step S93; Yes), the application control unit 26 sets the data size of the received segment used to calculate the processing time to 0 (step S94). In a case where the received segment has been stored in the segment buffer 252, the application control unit 26 has executed various types of processing in a state before the switching. Therefore, the application control unit 26 does not need to newly execute processing, and thus, sets the data size to 0. Then, the application control unit 26 proceeds to step S95.

In a case where the received segment has not been stored in the segment buffer 252 (step S93; No), the application control unit 26 calculates the processing time (step S95). More specifically, the application control unit 26 calculates the processing time by the following formula (1). Note that an initial value of Tproc is set to 0.

$$Tproc = Tproc + (8 \times size/bandwidth) + \qquad \text{formula (1)}$$
$$(8 \times size/(Nm \times demux\text{-}rate)) +$$
$$(8 \times size/(Nm \times decode\text{-}rate))$$

Tproc; total processing time (second)
size; data size (byte) of received segment
bandwidth; network band (bit/second)
Nm; total number of MP4 samples included in one segment in bit stream of group after switching
demux-rate; processing rate (bit/second) of demultiplexing processing and the like of the extraction unit 271 for bit stream of group after switching
decode-rate; processing rate (bit/second) of decoding processing and the like of the 3D audio decoder 273 for bit stream of group after switching The application control unit 26 determines whether or not the segments included in the bit streams of all the segment files 121 belonging to the group after the switching are received one by one (step S96). In a case where the segments of all the bit streams are not received one by one (step S96; No), the client device 20 proceeds to step S91.

In a case where the segments of all the bit streams are received one by one (step S96; Yes), the processing time calculation processing executed by the client device 20 ends.

As described above, the 3D audio decoder 273 ends the processing time calculation processing.

Then, the application control unit 26 determines the switching position by comparing a reproduction time of data stored in each buffer and a processing time taken until reproduction of the output device 30.

Figure 23:
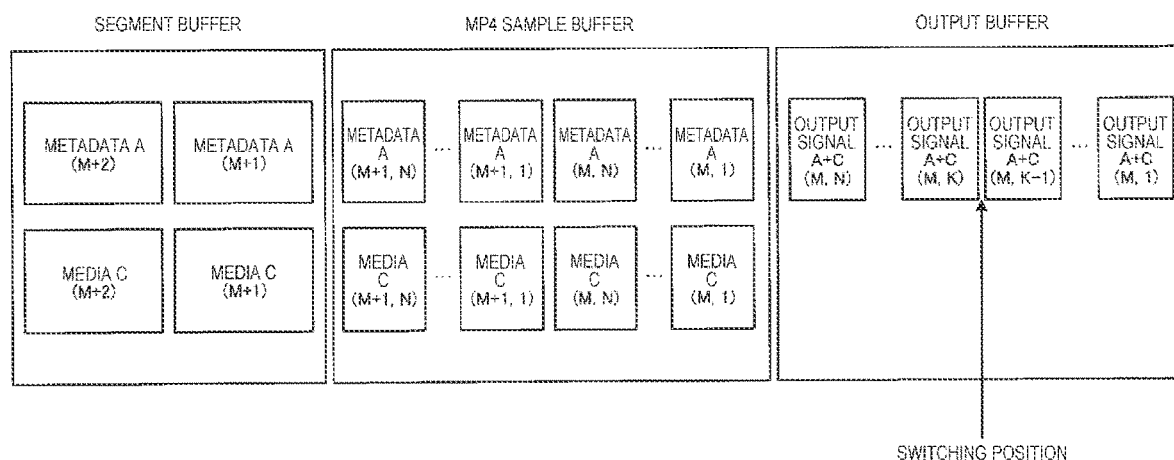
FIG. 23 is an explanatory diagram illustrating an example of switching in the output buffer according to the first embodiment of the present disclosure.

Here, FIG. 23 is an explanatory diagram illustrating an example of switching in the output buffer 274 according to the first embodiment. The segment buffer 252 illustrated in FIG. 23 indicates a state in which (M+2)th and (M+1)th segments are stored in a bit stream of metadata A. Furthermore, the segment buffer 252 indicates a state in which the (M+2)th and (M+1)th segments are stored in a bit stream of media C.

The MP4 sample buffer 272 illustrated in FIG. 23 indicates a state in which Nth to first MP4 samples belonging to the (M+1)th segment and an Mth segment are stored in the bit stream of the metadata A. Furthermore, the MP4 sample buffer 272 indicates a state in which the Nth to first MP4 samples belonging to the (M+1)th segment and the Mth segment are stored in the bit stream of the media C.

The output buffer 274 illustrated in FIG. 23 indicates a state in which Nth to first output signals generated from the Nth to first MP4 samples belonging to the Mth segment are stored in the bit streams of the metadata A and the media C. Then, the explanatory diagram illustrated in FIG. 23 illustrates a case where an output signal A+C (M, K−1) generated from a (K−1)th MP4 sample belonging to the Mth segment is determined to be the switching position in the bit streams of the metadata A and the media C.

Figure 24:
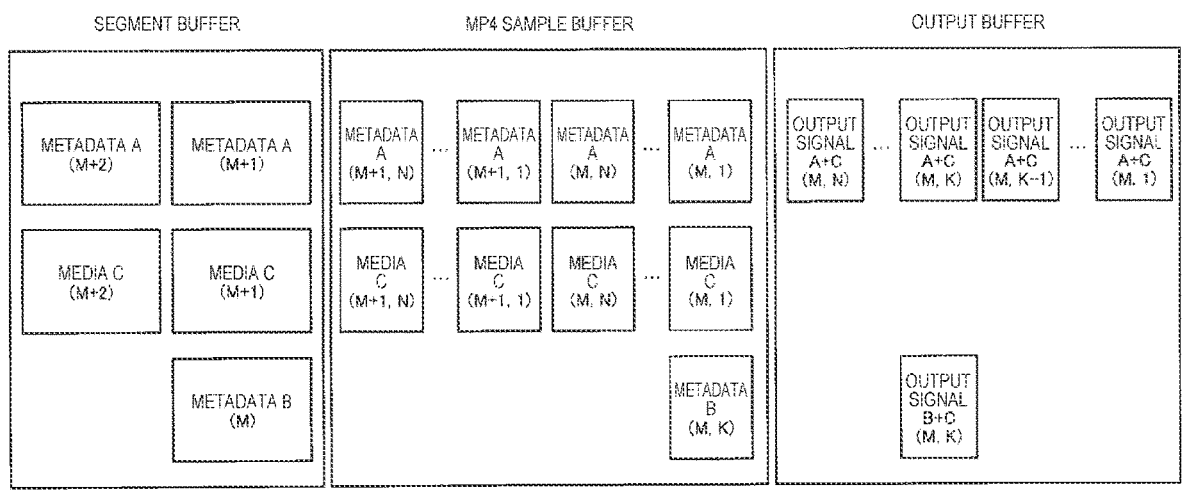
FIG. 24 is an explanatory diagram illustrating an example of a case where a bit stream of metadata B belonging to a group after switching is received in the diagram illustrated in FIG. 23 of the present disclosure.

FIG. 24 is an explanatory diagram illustrating an example of a case where a bit stream of metadata B belonging to a group after switching is received in the diagram illustrated in FIG. 23. The segment buffer 252 indicates a state in which the Mth segment is stored in the bit stream of the metadata B of the group after the switching. Furthermore, the MP4 sample buffer 272 indicates a state in which a Kth MP4 sample belonging to the Mth segment is stored in the bit stream of the metadata B of the group after the switching. Furthermore, the output buffer 274 indicates a state in which an output signal B+C (M, K) generated from the Kth MP4 sample belonging to the Mth segment is stored in the bit streams of the metadata B and the media C of the group after the switching. In this case, the client device 20 outputs output signals in order of an output signal A+C (M, 1), . . . , the output signal A+C (M, K−1), the output signal B+C (M, K), an output signal B+C (M, K+1), . . . .

More specifically, the application control unit 26 determines whether or not the switching position can be set in the output buffer 274 in the following formula (2). In a case where a condition of the formula (2) is satisfied, it is determined that the switching position can be set in the output buffer 274. The application control unit 26 determines whether or not the formula (2) is satisfied while incrementing Na. In other words, the application control unit 26 calculates the minimum Na satisfying the formula (2). Note that an upper limit of Na is a total number of output signals stored in the output buffer 274.

$$Tdisp \times Na > Tproc \qquad \text{formula (2)}$$

Tproc; total of processing time until one segment is downloaded for every bit stream of group after switching, and one MP4 sample is demultiplexed and decoded for every segment to output one output signal
Tdisp; display time of one output signal recorded in output buffer 274
Na; number of output signals In a case where it is determined that the switching position cannot be set in the output buffer 274, the application control unit 26 determines whether or not the switching position can be set in the MP4 sample buffer 272.

Figure 25:
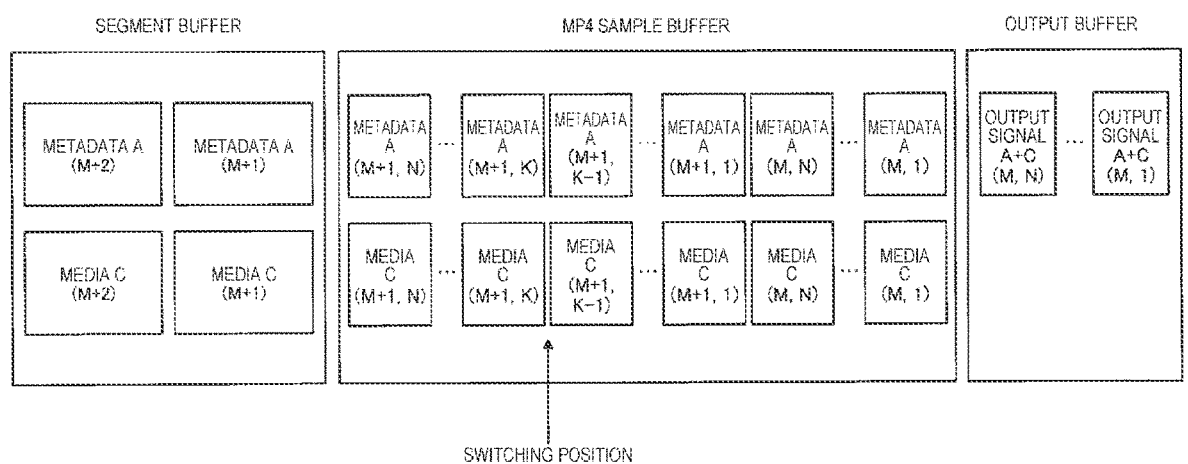
FIG. 25 is an explanatory diagram illustrating an example of switching in the MP4 sample buffer according to the first embodiment of the present disclosure.

Here, FIG. 25 is an explanatory diagram illustrating an example of switching in the MP4 sample buffer 272 according to the first embodiment. The segment buffer 252, the MP4 sample buffer 272, and the output buffer 274 illustrated in FIG. 25 store data similar to that of each buffer in FIG. 23. Then, the explanatory diagram illustrated in FIG. 25 illustrates a case where the (K−1)th MP4 sample belonging to the (M+1)th segment is determined to be the switching position in the bit streams of the metadata A and the media C.

Figure 26:
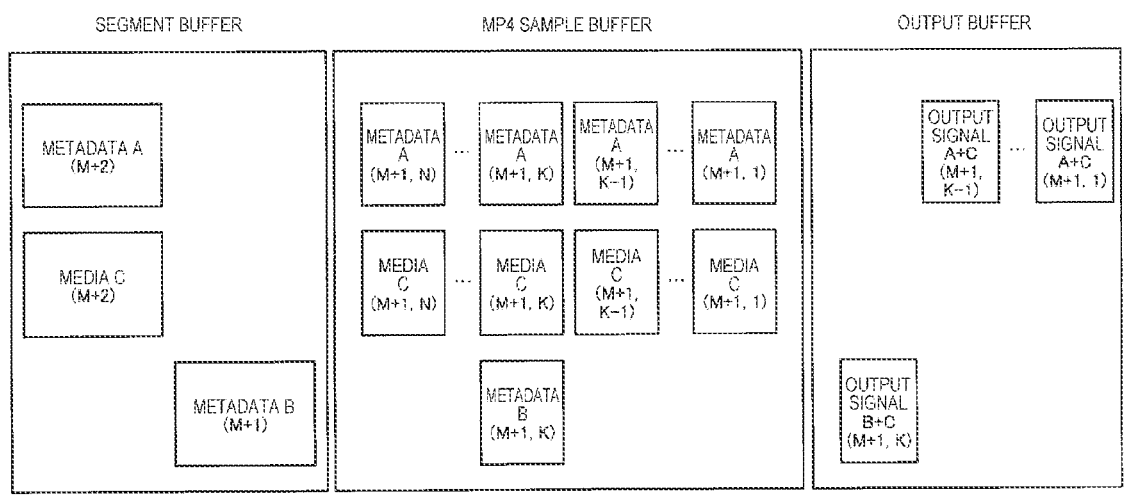
FIG. 26 is an explanatory diagram illustrating an example of a case where a bit stream of metadata B belonging to a group after switching is received in the diagram illustrated in FIG. 25 of the present disclosure.

FIG. 26 is an explanatory diagram illustrating an example of a case where a bit stream of metadata B belonging to a group after switching is received in the diagram illustrated in FIG. 25. The segment buffer 252 indicates a state in which the (M+1)th segment is stored in the bit stream of the metadata B of the group after the switching. Furthermore, the MP4 sample buffer 272 indicates a state in which the Kth MP4 sample belonging to the (M+1)th segment is stored in the bit stream of the metadata B of the group after the switching. Furthermore, the output buffer 274 indicates a state in which an output signal B+C (M+1, K) generated from a (K+1)th MP4 sample belonging to the Mth segment is stored in the bit streams of the metadata B and the media C of the group after the switching. In this case, the client device 20 outputs output signals in order of an output signal A+C (M+1, 1), . . . , an output signal A+C (M+1, K−1), the output signal B+C (M+1, K), an output signal B+C (M+1, K+1), . . . .

More specifically, the application control unit 26 determines whether or not the switching position can be set in the MP4 sample buffer 272 in the following formula (3). In a case where a condition of the formula (3) is satisfied, it is determined that the switching position can be set in the MP4 sample buffer 272. The application control unit 26 determines whether or not the formula (3) is satisfied while incrementing Nb. In other words, the application control unit 26 calculates the minimum Nb that satisfies the formula (3). Note that an upper limit of Nb is a total number of MP4 samples recorded in the MP4 sample buffer 272.

$$Tdisp \times (Na + Nb/Ng) > Tproc \qquad \text{formula (3)}$$

Tproc; total of processing time until one segment is downloaded for every bit stream of group after switching, and one MP4 sample is demultiplexed and decoded for every segment to output one output signal Tdisp; display time of one output signal recorded in output buffer 274

Ng; total number of bit streams in group before switching

Na; total number of output signals

Nb; number of MP4 samples

In a case where it is determined that the switching position cannot be set in the MP4 sample buffer 272, the application control unit 26 determines whether or not the switching position can be set to a first segment of the segment buffer 252. In other words, the application control unit 26 determines whether or not the switching position can be set to a segment, of the segments stored in the segment buffer 252, in which the MP4 sample is not stored in the MP4 sample buffer 272 and which is subjected to the next demultiplexing processing.

Figure 27:
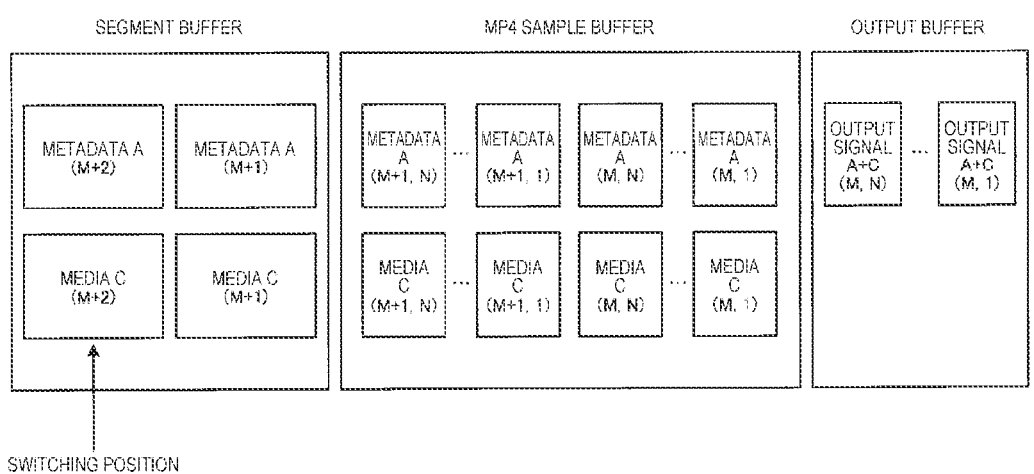
FIG. 27 is an explanatory diagram illustrating an example of switching in the segment buffer according to the first embodiment of the present disclosure.

Here, FIG. 27 is an explanatory diagram illustrating an example of switching in the segment buffer 252 according to the first embodiment. The segment buffer 252, the MP4 sample buffer 272, and the output buffer 274 illustrated in FIG. 27 store data similar to that of each buffer in FIG. 23. Then, the explanatory diagram illustrated in FIG. 27 illustrates a case where the middle of the (M+2)th segment is determined to be the switching position in the bit streams of the metadata A and the media C. More specifically, a case where the (K−1)th MP4 sample belonging to the (M+2)th segment is determined to be the switching position is illustrated.

Figure 28:
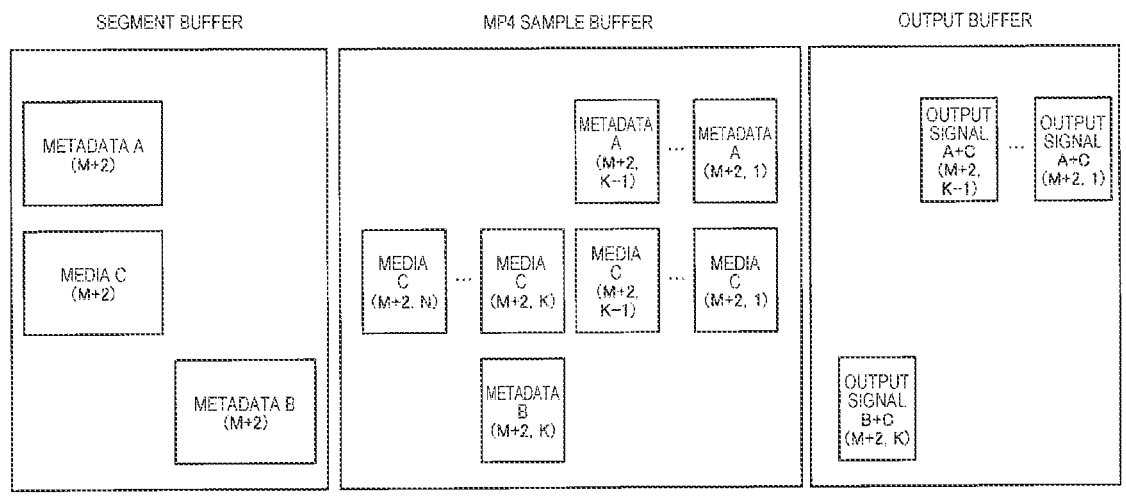
FIG. 28 is an explanatory diagram illustrating an example of a case where a bit stream of metadata B belonging to a group after switching is received in the diagram illustrated in FIG. 27 of the present disclosure.

FIG. 28 is an explanatory diagram illustrating an example of a case where a bit stream of metadata B belonging to a group after switching is received in the diagram illustrated in FIG. 27. The segment buffer 252 indicates a state in which the (M+2)th segment is stored in the bit stream of the metadata B of the group after the switching. Furthermore, the MP4 sample buffer 272 indicates a state in which the Kth MP4 sample belonging to the (M+2)th segment is stored in the bit stream of the metadata B of the group after the switching. Furthermore, the output buffer 274 indicates a state in which an output signal B+C (M+2, K) generated from the (K+1)th MP4 sample belonging to the (M+2)th segment is stored in the bit streams of the metadata B and the media C of the group after the switching. In this case, the client device 20 outputs output signals in order of an output signal A+C (M+2, 1), . . . , an output signal A+C (M+2, K−1), the output signal B+C (M+2, K), an output signal B+C (M+2, K+1), . . . .

More specifically, the application control unit 26 determines whether or not the switching position can be set to the first segment of the segment buffer 252 in the following formula (4). In a case where a condition of the formula (4) is satisfied, it is determined that the switching position can be set to the first segment of the segment buffer 252. The application control unit 26 determines whether or not the formula (4) is satisfied while incrementing Nc. In other words, the application control unit 26 calculates the minimum Nc that satisfies the formula (4). Note that an upper limit of Nc is a total number of segments recorded in the segment buffer 252.

Here, the MP4 sample of the first segment of the segment buffer 252 is in a state of a segment before the demultiplexing processing is performed. Therefore, Composition Time of the MP4 sample is not clear. Therefore, a difference of output time of the MP4 sample is fed back from the media engine 27 for every bit stream, and is added to output time of the segment to obtain the output time of the MP4 sample.

$$Tdisp \times (Na + Nb/Ng + Nc) > Tproc \qquad \text{formula (4)}$$

Tproc; total of processing time until one segment is downloaded for every bit stream of group after switching, and one MP4 sample is demultiplexed and decoded for every segment to output one output signal Tdisp; display time of one output signal recorded in output buffer 274

Ng; total number of bit streams in group before switching

Na; total number of output signals

Nb; total number of MP4 samples

Nc; number of MP4 samples of segment

Figure 29:
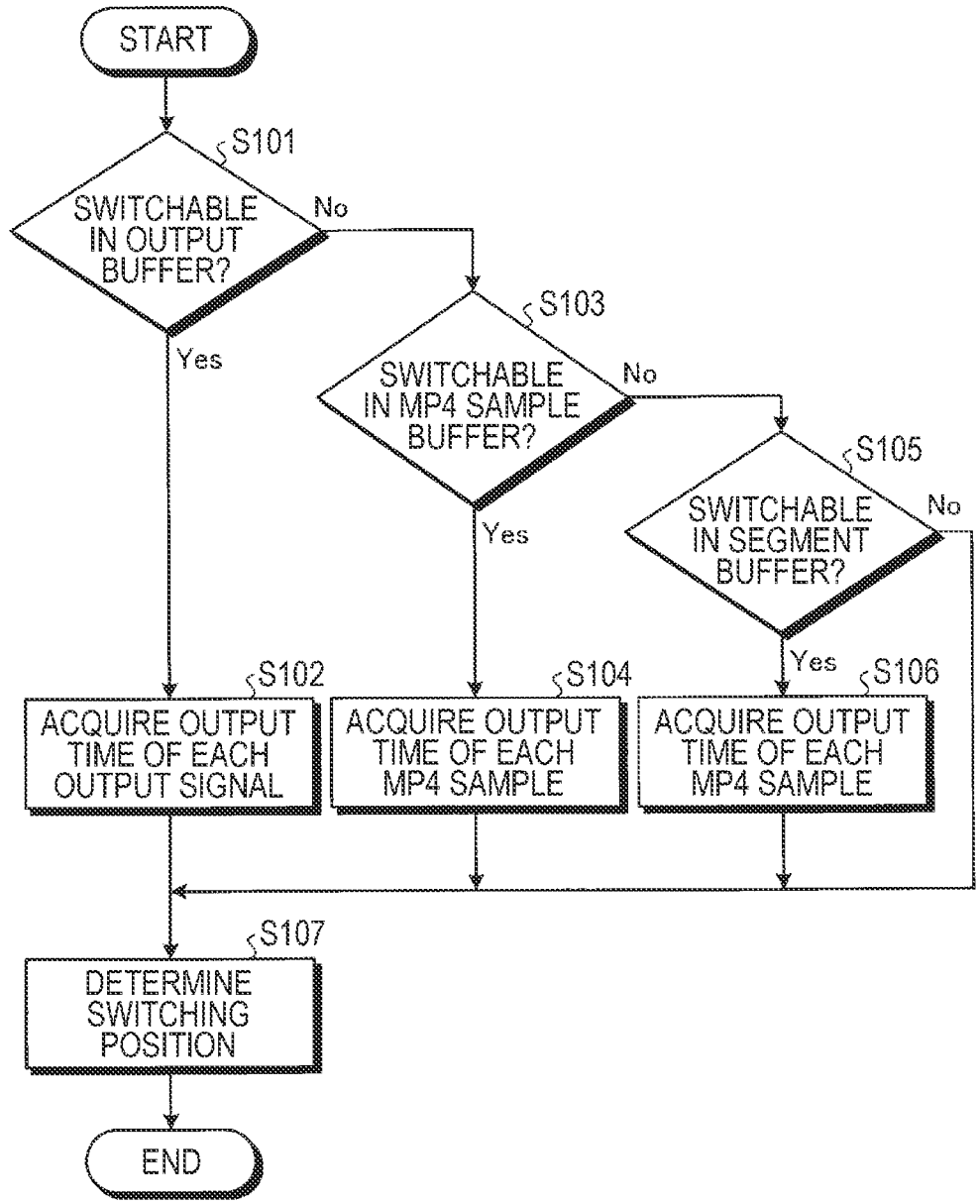
FIG. 29 is a flowchart illustrating an example of group switching position determination processing executed by the client device according to the first embodiment of the present disclosure.

Here, the setting of the switching position described above will be described with reference to a flowchart. FIG. 29 is a flowchart illustrating an example of group switching position determination processing executed by the client device 20 according to the first embodiment.

The application control unit 26 determines whether or not the switching position can be set in the output buffer 274 (step S101). In other words, the application control unit 26 determines whether or not the formula (2) is satisfied.

In a case where the switching position can be set in the output buffer 274 (step S101; Yes), the application control unit 26 acquires output time of an output signal satisfying the formula (2) (step S102). More specifically, in a case where output signals are arranged in order of the earliest to be output to the output device 30, the application control unit 26 acquires output time of an Na-th output signal satisfying the formula (2) for every bit stream.

In a case where the switching position cannot be set in the output buffer 274 (step S101; No), the application control unit 26 determines whether or not the switching position can be set in the MP4 sample buffer 272 (step S103). In other words, the application control unit 26 determines whether or not the formula (3) is satisfied.

In a case where the switching position can be set in the MP4 sample buffer 272 (step S103; Yes), the application control unit 26 acquires output time of an MP4 sample satisfying the formula (3) (step S104). More specifically, in a case where MP4 samples are arranged in order of the earliest to be output to the output buffer 274, the application control unit 26 acquires output time of an Nb-th MP4 sample satisfying the formula (3) for every bit stream.

In a case where the switching position cannot be set in the MP4 sample buffer 272 (step S103; No), the application control unit 26 determines whether or not the switching position can be set to the first segment of the segment buffer 252 (step S105). In other words, the application control unit 26 determines whether or not the formula (4) is satisfied.

In a case where the switching position cannot be set in the MP4 sample buffer 272 (step S105; No), the application control unit 26 proceeds to step S107.

In a case where the switching position can be set to the first segment of the segment buffer 252 (step S105; Yes), the application control unit 26 acquires output time of an MP4 sample satisfying the formula (4) (step S106). More specifically, in a case where MP4 samples are arranged in order of the earliest to be output to the MP4 sample buffer 272, the application control unit 26 acquires output time of the Nb-th MP4 sample satisfying the formula (4) for every bit stream.

The application control unit 26 determines the acquired output time as the switching position (step S107).

As described above, the application control unit 26 ends the group switching position determination processing.

[Download Procedure of Group after Switching According to First Embodiment]

Next, a procedure of download processing of the segment files 121 belonging to the group after the switching in a case where the content group is switched according to the first embodiment will be described.

It is not necessary to download the bit stream of the segment file 121 to be commonly used again before and after the switching of the content group. Therefore, in a case where the segment file 121 belonging to the group after the switching is stored in a first storage unit such as the segment buffer 252 and the like that stores the segment included in the bit stream of the received segment file 121, the download unit 251 does not receive the segment file 121.

Figure 30:
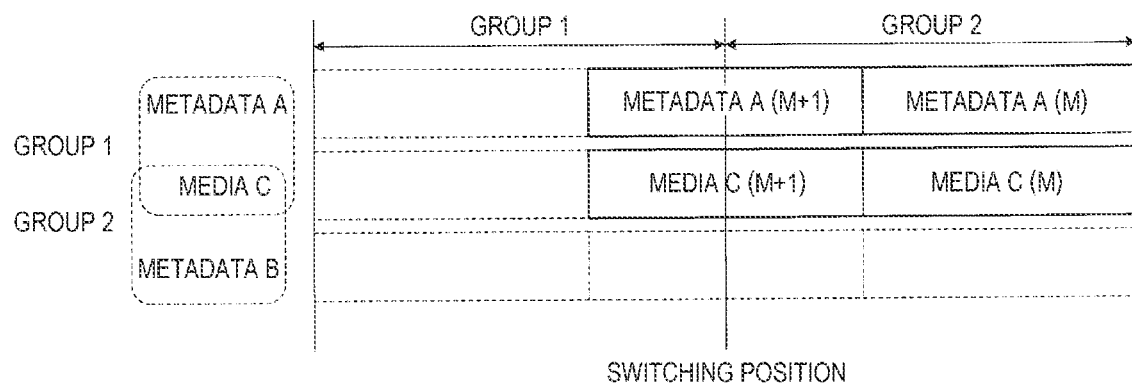
FIG. 30 is an explanatory diagram illustrating an example of download of a segment file after switching of the present disclosure.

Here, FIG. 30 is an explanatory diagram illustrating an example of download of the segment file 121 after switching. FIG. 30 illustrates a state of the segment buffer 252. More specifically, it illustrates that metadata A and media C belonging to a group 1 are downloaded, subjected to processing such as demultiplexing processing and the like, and switched to a group 2 at a switching position. Therefore, a state in which metadata B belonging to the group 2 is not downloaded yet and is not stored in the segment buffer 252 is shown.

Furthermore, the processing waits for metadata A (M), metadata A (M+1), media C (M), and media C (M+1) to be sequentially input to the extraction unit 271. Furthermore, since metadata A (M−1) and media C (M−1) are input to the extraction unit 271, they are deleted from the segment buffer 252.

Here, the media C is commonly used in both the group 1 and the group 2. Furthermore, the media C has been downloaded. Therefore, the client device 20 does not need to newly download the medium C. The application control unit 26 compares a bit stream number of the segment file 121 scheduled to be downloaded and a bit stream number of segment attribute information of a segment stored in the segment buffer 252, and determines necessity of downloading. In a case where the bit stream number of the segment file 121 scheduled to be downloaded is stored, the application control unit 26 determines that downloading is unnecessary. In a case where the bit stream number of the segment file 121 scheduled to be downloaded is not stored, the application control unit 26 determines that the downloading is necessary.

Furthermore, at the time of the downloading, the download unit 251 deletes a segment stored in the segment buffer 252 on condition that a free space of the segment buffer 252 is less than a threshold. In other words, the download unit 251 holds the segment stored in the segment buffer 252 without deleting it on condition that the free space of the segment buffer 252 is more than or equal to the threshold. Then, the segment held without being deleted can be used to avoid an image sound gap in a case where content switching is not completed.

Figure 31:
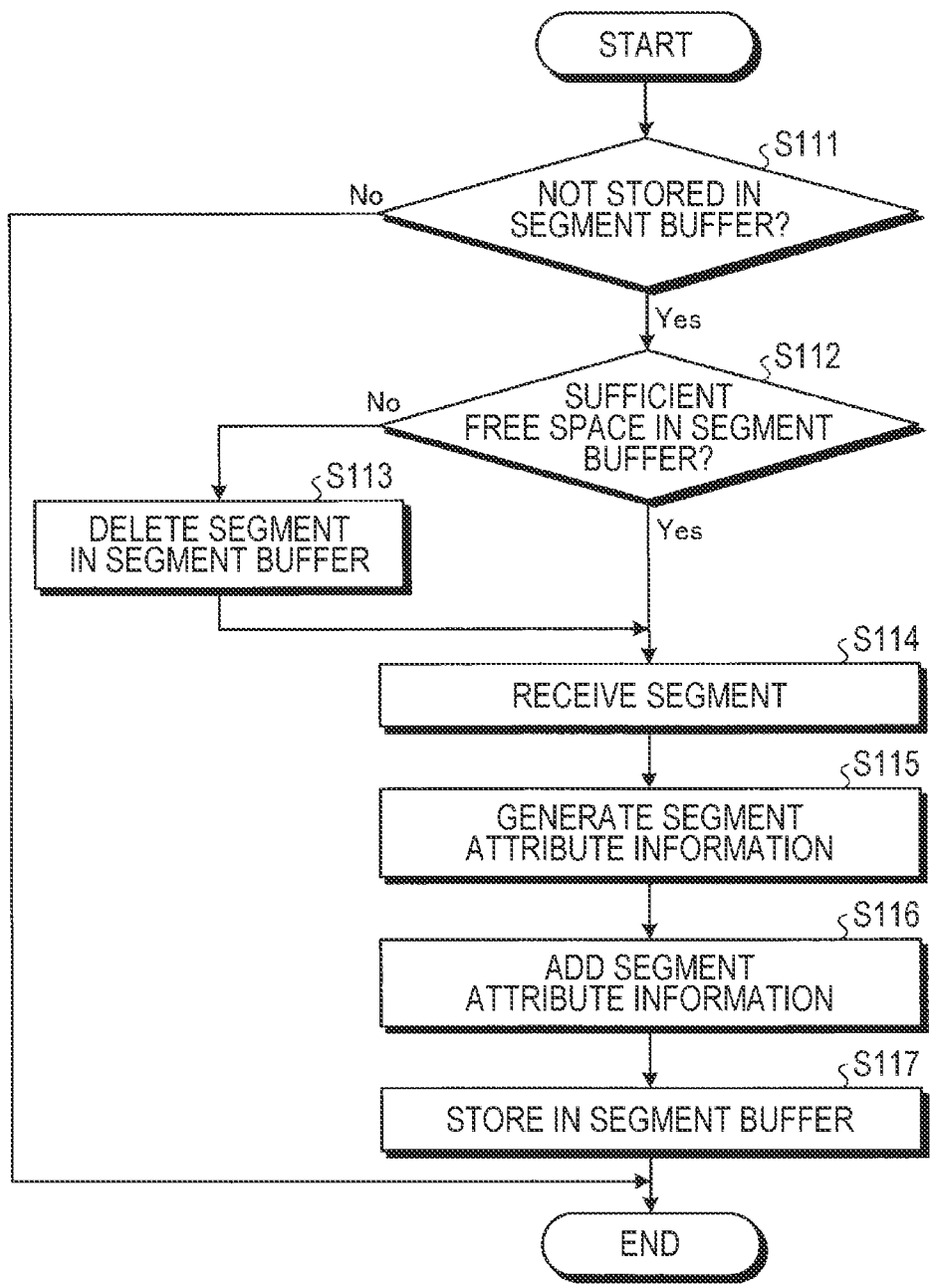
FIG. 31 is a flowchart illustrating an example of download processing of a group after switching executed by the client device according to the first embodiment of the present disclosure.

Here, the determination of the switching position described above will be described with reference to a flowchart. FIG. 31 is a flowchart illustrating an example of download processing of a group after switching executed by the client device 20 according to the first embodiment.

The application control unit 26 determines whether or not the segment included in the bit stream of the segment file 121 after the switching is stored in the segment buffer 252 (step S111). In other words, the application control unit 26 determines whether or not a segment having the same bit stream number as the bit stream number of the segment file 121 scheduled to be downloaded and having a segment number after the switching position has been detected.

In a case where the segment of the segment file 121 after the switching is stored in the segment buffer 252 (step S111; No), the client device 20 ends the processing since the downloading has been completed.

In a case where the segment of the segment file 121 after the switching is not stored in the segment buffer 252 (step S111; Yes), the application control unit 26 determines whether or not there is a sufficient free space in the segment buffer 252 (step S112). Here, the sufficient free space means, for example, that the free space is more than or equal to a threshold. The threshold may be a preset value, may be a value calculated on the basis of a processing time, or may be a value calculated on the basis of data size of the segment file 121 and the like to be downloaded.

In a case where there is no sufficient free space in the segment buffer 252 (step S112; No), the application control unit 26 deletes the segment stored in the segment buffer 252 (step S113).

In a case where there is a sufficient free space in the segment buffer 252 (step S112; Yes), the application control unit 26 does not delete the segment stored in the segment buffer 252.

The download unit 251 of the HTTP access control unit 25 receives the segment included in the bit stream of the segment file 121 (step S114).

The download unit 251 of the HTTP access control unit 25 generates segment attribute information corresponding to the received segment (step S115).

The download unit 251 of the HTTP access control unit 25 adds the generated segment attribute information to the received segment (step S116).

The HTTP access control unit 25 stores the segment to which the segment attribute information is added in the segment buffer 252 (step S117).

As described above, the client device 20 ends the download processing.

Demultiplexing Procedure of Group after Switching According to First Embodiment

Next, a procedure of demultiplexing processing of a segment belonging to the group after the switching in a case where the content group is switched according to the first embodiment will be described.

In a case where an MP4 sample extracted from the bit stream of the segment file 121 to be commonly used is stored in the MP4 sample buffer 272 before and after the switching of the content group, it is not necessary to perform the demultiplexing processing again. Therefore, in a case where the MP4 sample attribute information including group information indicating the group to which the MP4 sample belongs is added to the MP4 sample and stored in a second storage unit such as the MP4 sample buffer 272 and the like, the extraction unit 271 does not extract the MP4 sample belonging to the group after the switching on condition that the MP4 sample belonging to the group after the switching is stored in the MP4 sample buffer 272. Then, the media engine 27 compares a bit stream number of the segment attribute information of the segment to be processed and a bit stream number of the MP4 sample attribute information of the MP4 sample buffer 272, and determines necessity of the demultiplexing processing.

Furthermore, in the demultiplexing processing, the extraction unit 271 deletes an MP4 sample stored in the MP4 sample buffer 272 on condition that a free space of the MP4 sample buffer 272 is less than a threshold. In other words, the extraction unit 271 holds the MP4 sample stored in the MP4 sample buffer 272 without deleting it on condition that the free space of the MP4 sample buffer 272 is more than or equal to the threshold. Then, the MP4 sample held without being deleted can be used to avoid an image sound gap in a case where content switching is not completed.

Figure 32:
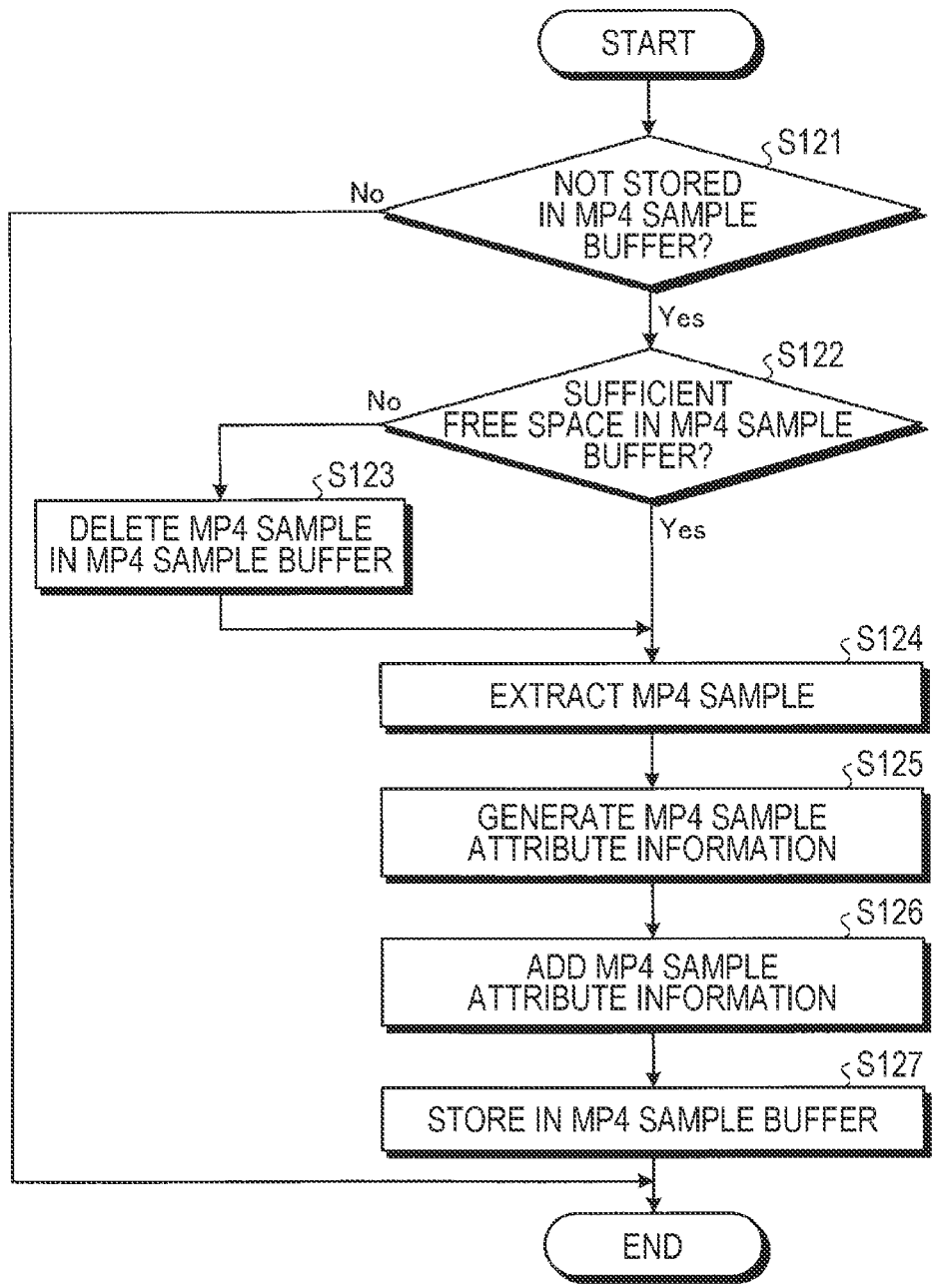
FIG. 32 is a flowchart illustrating an example of demultiplexing processing of a segment belonging to a group after switching executed by the client device according to the first embodiment of the present disclosure.

Here, FIG. 32 is a flowchart illustrating an example of the demultiplexing processing of the segment belonging to the group after the switching executed by the client device 20 according to the first embodiment.

The application control unit 26 determines whether or not the MP4 sample included in the bit stream of the segment file 121 after the switching is not stored in the MP4 sample buffer 272 (step S121). In other words, the application control unit 26 determines whether or not the MP4 sample having the same bit stream number as the bit stream number of the segment scheduled to be demultiplexed, the segment number after the switching position, and the MP4 sample number after the switching position has been detected.

In a case where the MP4 sample after the switching is stored in the MP4 sample buffer 272 (step S121; No), the client device 20 ends the processing since the demultiplexing processing has been completed.

In a case where the MP4 sample after the switching is not stored in the MP4 sample buffer 272 (step S121; Yes), the application control unit 26 determines whether or not there is a sufficient free space in the MP4 sample buffer 272 (step S122). Here, the sufficient free space means, for example, that the free space is more than or equal to a threshold. The threshold may be a preset value, may be a value calculated on the basis of a processing time, or may be a value calculated on the basis of data size of the segment file 121 and the like to be downloaded.

In a case where there is no sufficient free space in the MP4 sample buffer 272 (step S122; No), the extraction unit 271 deletes the MP4 sample stored in the MP4 sample buffer 272 (step S123).

In a case where there is a sufficient free space in the MP4 sample buffer 272 (step S122; Yes), the extraction unit 271 does not delete the MP4 sample stored in the MP4 sample buffer 272.

The extraction unit 271 extracts an MP4 sample from a segment acquired from the segment buffer 252 (step S124).

The extraction unit 271 generates MP4 sample attribute information corresponding to the extracted MP4 sample (step S125).

The extraction unit 271 adds the generated MP4 sample attribute information to the extracted MP4 sample (step S126).

The extraction unit 271 stores the MP4 sample to which the MP4 sample attribute information is added in the MP4 sample buffer 272 (step S127).

As described above, the client device 20 ends the demultiplexing processing.

Decoding Procedure of Group after Switching According to First Embodiment

Next, a procedure of decoding processing of an MP4 sample belonging to the group after the switching in a case where the content group is switched according to the first embodiment will be described.

In a case where an output signal generated from the MP4 sample extracted from the bit stream of the segment file 121 to be commonly used is stored in the output buffer 274 before and after the switching of the content group, it is not necessary to execute decoding processing again. Therefore, the 3D audio decoder 273 does not decode the MP4 sample on condition that the output signal generated by decoding the MP4 sample belonging to the group after the switching is stored in a third storage unit such as the output buffer 274 and the like. Therefore, the media engine 27 determines necessity of the decoding according to whether or not group information indicated by output signal attribute information of the output signal stored in the output buffer 274 is group information after the switching and output time is after the switching position.

Figure 33:
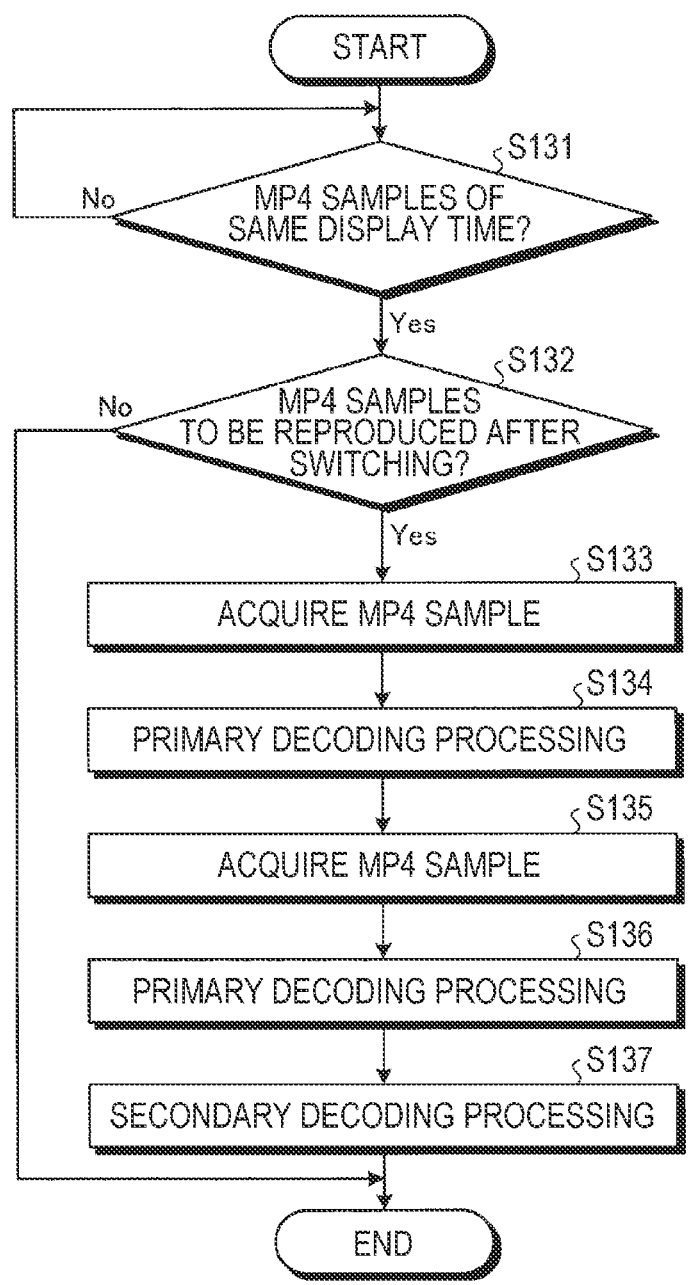
FIG. 33 is a flowchart illustrating an example of decoding processing of an MP4 sample belonging to a group after switching executed by the client device according to the first embodiment of the present disclosure.

Here, FIG. 33 is a flowchart illustrating an example of the decoding processing of the MP4 sample belonging to the group after the switching executed by the client device 20 according to the first embodiment.

The 3D audio decoder 273 determines whether or not two MP4 samples having the same output time are stored in the MP4 sample buffer 272 (step S131). In other words, the 3D audio decoder 273 determines whether or not the MP4 samples having the audio object and the metadata are stored in the MP4 sample buffer 272. In a case where the two MP4 samples having the same output time are not stored in the MP4 sample buffer 272 (step S131; No), the 3D audio decoder 273 stands by.

In a case where the two MP4 samples having the same output time are stored in the MP4 sample buffer 272 (step S131; Yes), the 3D audio decoder 273 determines whether or not the MP4 samples having the same output time are MP4 samples to be reproduced after switching (step S132). Specifically, on the basis of MP4 sample attribute information of the MP4 samples having the same output time, the 3D audio decoder 273 determines whether the MP4 samples having the same output time have output time after the switching position and group information after the switching.

In a case where the MP4 samples are not reproduced after the switching (step S132; No), the 3D audio decoder 273 ends the processing.

In a case where the MP4 samples are reproduced after the switching (step S132; Yes), the 3D audio decoder 273 acquires one MP4 sample of the two MP4 samples having the same output time (step S133).

The 3D audio decoder 273 performs primary decoding processing on the acquired MP4 sample (step S134).

The 3D audio decoder 273 acquires another MP4 sample which is not acquired in step S133 of the two MP4 samples having the same output time (step S135).

The 3D audio decoder 273 performs the primary decoding processing on the acquired MP4 sample (step S136).

The 3D audio decoder 273 executes secondary decoding processing (step S137).

As described above, the 3D audio decoder 273 ends the decoding processing after the switching.

Output Procedure of Group after Switching According to First Embodiment

Next, a procedure of output processing of an output signal belonging to the group after the switching in a case where the content group is switched according to the first embodiment will be described. The rendering unit 2735 outputs an output signal generated from the bit stream of the segment file 121 belonging to the group after the switching from the switching position to the output device 30. At that time, the rendering unit 2735 outputs the output signal generated from the MP4 sample belonging to the group after the switching to the output device 30, and then deletes an output signal generated from the MP4 sample belonging to the group before the switching. In this way, by deleting the output signal generated from the MP4 sample belonging to the group before the switching after outputting the output signal to the output device 30, the rendering unit 2735 can be used to avoid an image sound gap in a case where content switching is not completed.

Figure 34:
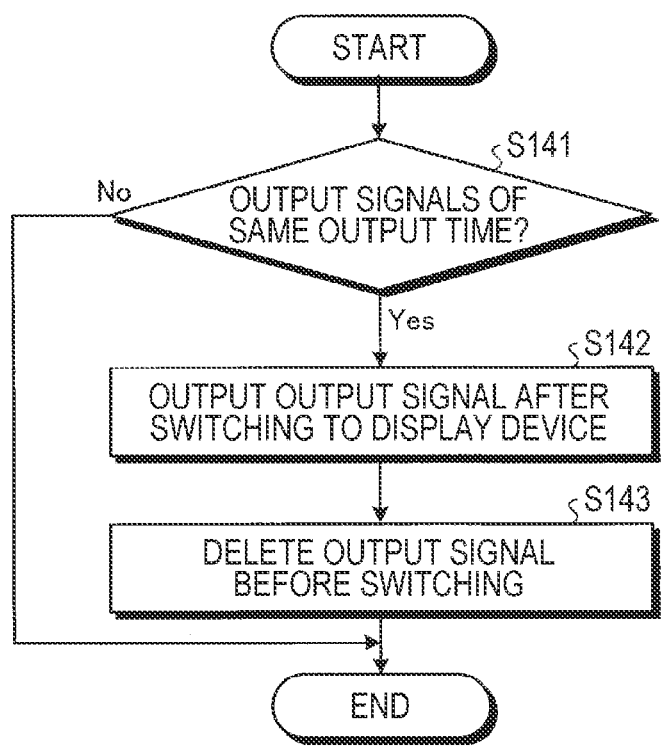
FIG. 34 is a flowchart illustrating an example of output processing of an output signal belonging to a group after switching executed by the client device according to the first embodiment of the present disclosure.

Here, FIG. 34 is a flowchart illustrating an example of the output processing of the output signal belonging to the group after the switching executed by the client device 20 according to the first embodiment.

The rendering unit 2735 determines whether or not output signals having the same output time and the output signals of groups before and after the switching are stored in the output buffer 274 (step S141).

In a case where the output signals having the same output time and the output signals of the groups before and after the switching are not stored in the output buffer 274 (step S141; No), the rendering unit 2735 ends the processing.

In a case where the output signals having the same output time and the output signals of the groups before and after the switching are stored in the output buffer 274 (step S141; Yes), the rendering unit 2735 outputs the output signal of the group after the switching to the output device 30 (step S142).

The rendering unit 2735 deletes the output signal of the group before the switching from the output buffer 274 (step S143).

As described above, the 3D audio decoder 273 ends the output processing after the switching.

As described above, the client device 20 according to the first embodiment adds the segment attribute information, the MP4 sample attribute information, and the output signal attribute information to each piece of information. Then, the client device 20 calculates the switching position on the basis of the information, thereby realizing the switching of the content group in units of MP4 samples in a shorter time than those of segments. Therefore, the client device 20 can shorten a time required for content switching.

Modified Example (1) of First Embodiment

In the first embodiment described above, a case of the segment files 121 arranged in order of reproducing data has been described. In the modified example (1), a case of the segment file 121 having a group of pictures (GOP) structure will be described.

The case of the segment file 121 having the GOP structure is different in that the application control unit 26 calculates a switching position in units of GOPs. More specifically, in the case of the segment file 121 having the GOP structure, in a case where a position that is not a randomly accessible point is determined as the switching position, interframe prediction cannot be performed. Therefore, in a case where the MP4 sample derived on the basis of the calculated processing time is a randomly accessible point indicated by Sync Sample Box (stss) included in a moov box of the segment file 121, the application control unit 26 determines the MP4 sample as the switching position. The randomly accessible point is, for example, a reference image such as an intra (I) picture and the like in the GOP structure.

Here, FIG. 35 is a diagram illustrating a data configuration example of the MP4 sample stored in MP4 sample buffer 272 according to the modified example (1). MP4 sample attribute information according to the modified example (1) includes possible point information. The possible point information is a flag indicating whether or not random access is possible. In other words, the possible point information is a flag indicating whether or not the MP4 sample can become the switching position before decoding.

The extraction unit 271 adds the MP4 sample attribute information including the possible point information indicating whether or not the MP4 sample can become the switching position. In other words, in a case where the MP4 sample is a reference image in interframe prediction, the extraction unit 271 adds the MP4 sample attribute information including the possible point information indicating the possibility of becoming the switching position. Specifically, the extraction unit 271 sets "1" in the possible point information in a case where the MP4 sample can become the switching position, and sets "0" in the possible point information in a case where the MP4 sample is inappropriate as the switching position. Then, in a case where the possible point information included in the MP4 sample attribute information indicates that the MP4 sample can become the switching position, the application control unit 26 determines it as the switching position.

Download Processing Procedure According to Modified Example (1)

Figure 36:
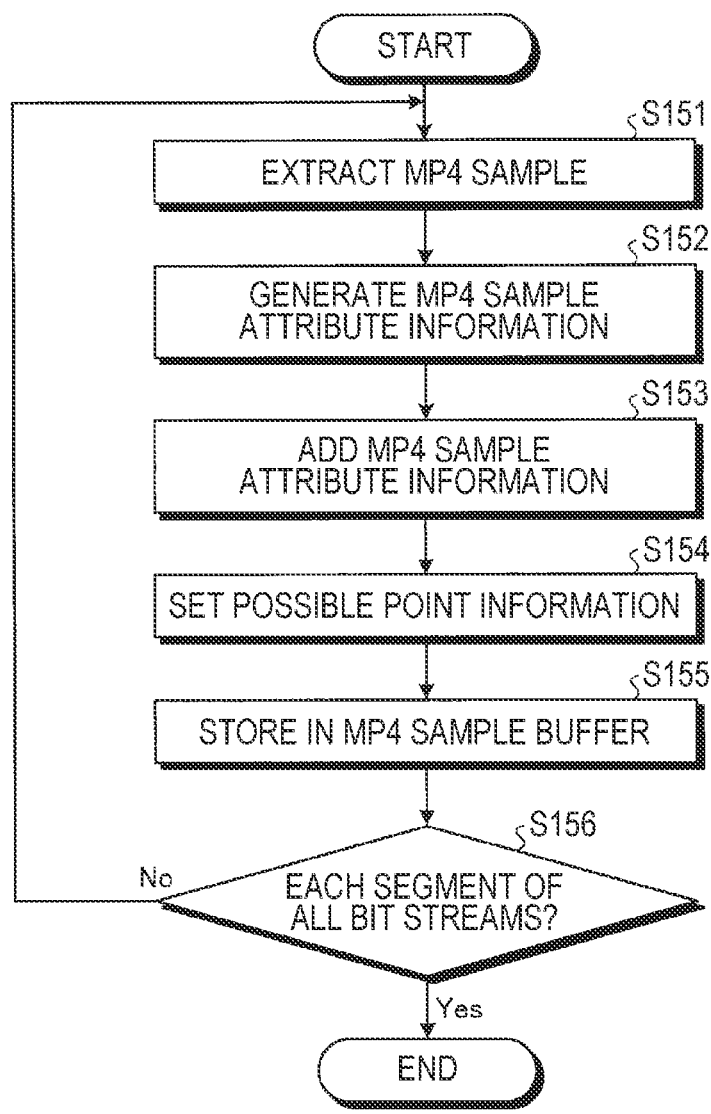
FIG. 36 is a flowchart illustrating an example of demultiplexing processing executed by the extraction unit according to the modified example (1) of the present disclosure.

Next, demultiplexing processing executed by the extraction unit 271 according to the modified example (1) will be described. FIG. 36 is a flowchart illustrating an example of the demultiplexing processing executed by the extraction unit 271 according to the modified example (1).

Processing from step S151 to step S153 is the same as the processing from step S41 to step S43 illustrated in FIG. 17.

The extraction unit 271 sets the possible point information of the target MP4 sample on the basis of Sync Sample Box (stss) (step S154).

Processing from step S155 to step S156 is the same as the processing from step S44 to step S45 illustrated in FIG. 17.

Thus, the extraction unit 271 ends the demultiplexing processing.

Determination of Position for Switching Group According to Modified Example (1)

In calculation of a total processing time (Tproc), the switching position is determined in units of GOPs. In other words, decoding cannot be executed unless there is an MP4 sample in which a value of the possible point information of the MP4 sample attribute information is "1".

More specifically, the application control unit 26 calculates the total processing time (Tproc) by the following formula (5). Note that an initial value of Tproc is set to 0.

$$Tproc = Tproc + (8 \times size/bandwidth) + \\ (8 \times size/(Ngop \times demux\text{-}rate)) + \\ (8 \times size/(Ngop \times decode\text{-}rate))$$
formula (5)

Figure 37:
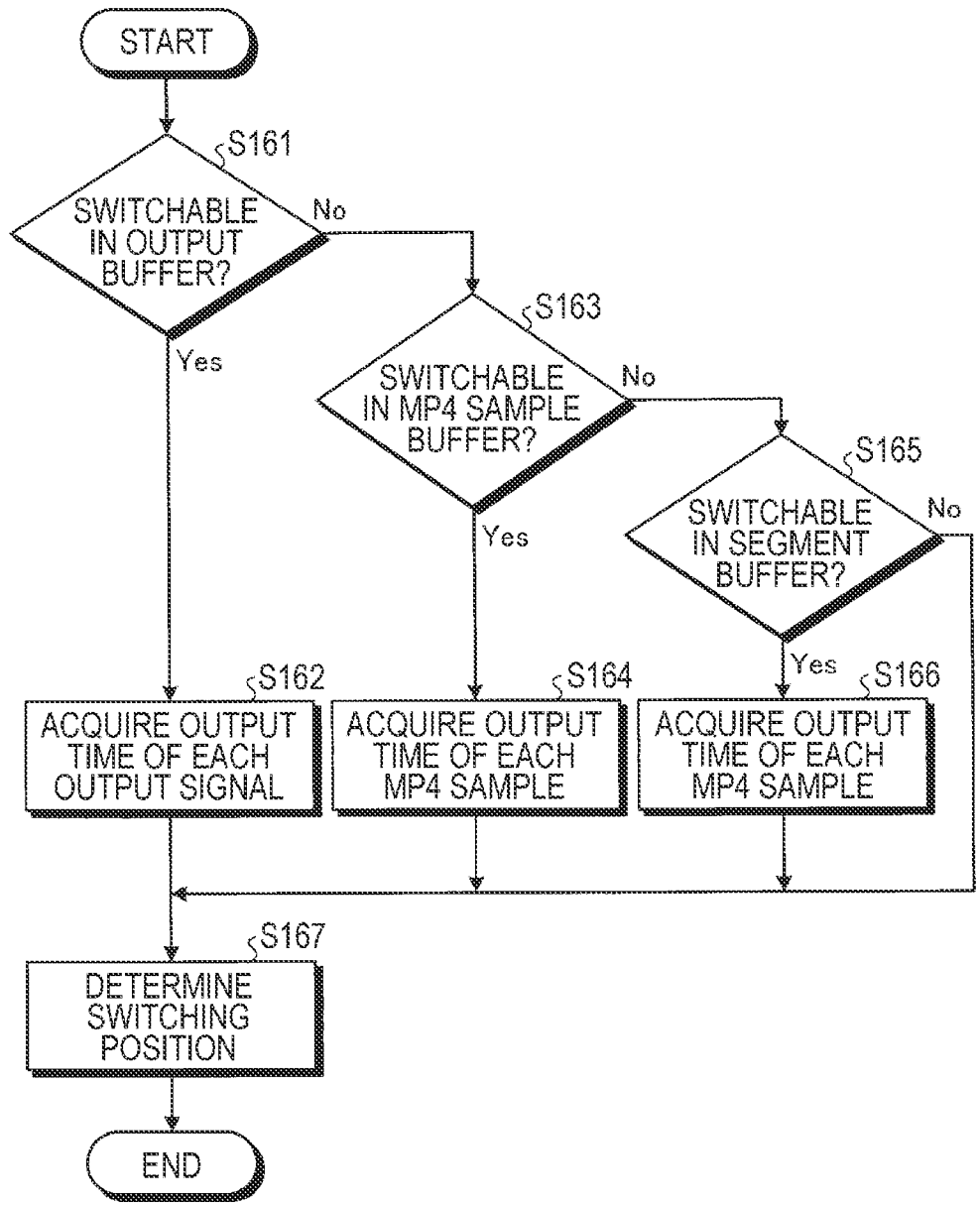
FIG. 37 is a flowchart illustrating an example of group switching position determination processing executed by the client device according to the modified example (1) of the present disclosure.

Tproc; total processing time (second)
size; data size (byte) of received segment
bandwidth; network band (bit/second)
Ngop; total number of GOPs included in one segment in bit stream of group after switching
demux-rate; processing rate (bit/second) of demultiplexing processing and the like of the extraction unit 271 for bit stream of group after switching
decode-rate; processing rate (bit/second) of decoding processing and the like of the 3D audio decoder 273 for bit stream of group after switching Next, determining processing of the switching position of the segment file 121 having the GOP structure according to the modified example (1) will be described. FIG. 37 is a flowchart illustrating an example of group switching position determination processing executed by the client device 20 according to the modified example (1).

Processing from step S161 to step S162 is the same as the processing from step S101 to step S102 illustrated in FIG. 30.

The application control unit 26 determines whether or not the switching position can be set in the MP4 sample buffer 272 (step S163). More specifically, the application control unit 26 determines whether or not the MP4 sample, in which the Tproc calculated by the formula (5) satisfies the formula (2) and the possible point information of the MP4 sample attribute information is "1", is present in the MP4 sample buffer 272.

In a case where the switching position can be set in the MP4 sample buffer 272 (step S163; Yes), the application control unit 26 acquires output time of the corresponding MP4 sample (step S164).

In a case where the switching position cannot be set in the MP4 sample buffer 272 (step S163; No), the application control unit 26 determines whether or not the switching position can be set in the segment buffer 252 (step S165).

More specifically, the application control unit 26 determines whether or not the Tproc calculated by the formula (5) satisfies the formula (3). Furthermore, the possible point information of the MP4 sample attribute information is required to be "1" even in a state in which the MP4 sample set as the switching position is stored in the segment buffer 252. However, since it is before the extraction unit 271 sets the possible point information of the MP4 sample, the value of the possible point information of the corresponding MP4 sample is unknown.

Therefore, the application control unit 26 estimates that the possible point information, that is, the randomly accessible point is at a boundary such as the head of the GOP structure and the like. Then, the application control unit 26 determines whether or not the switching position can be set in the segment buffer 252 according to whether or not the MP4 sample at the boundary of the GOP structure satisfies the formula (3).

In a case where the switching position can be set in the segment buffer 252 (step S165; Yes), the application control unit 26 acquires the output time of the corresponding MP4 sample (step S166).

The application control unit 26 determines the acquired output time as the switching position (step S167).

As described above, the application control unit 26 ends the group switching position determination processing.

As described above, the client device 20 according to the modified example (1) of the first embodiment adds the possible point information to the MP4 sample attribute information. Then, the client device 20 determines whether or not the switching position can be set on the basis of the possible point information. Therefore, even in a case where the segment file 121 has the GOP structure, the client device 20 can shorten a time required for content switching.

(Effects)

A client device 20 includes a download unit 251, an extraction unit 271, an application control unit 26, and a rendering unit 2735. The download unit 251 receives a segment file 121 having a plurality of segments and an MPD file 122 in which a group to which the segment file 121 belongs is set by communication conforming to the HTTP protocol. The extraction unit 271 extracts one or more MP4 samples included in the segment of the bit stream of the segment file 121 received by the download unit 251, and adds MP4 sample attribute information including a reproduction start time of the MP4 sample to the MP4 sample in demultiplexing processing. The application control unit 26 accepts operations such as start of streaming reproduction, stop of streaming reproduction, and switching of a content group, and the like. Furthermore, on the basis of the accepted switching operation of the content group, segment attribute information, the MP4 sample attribute information, and output signal attribute information, the application control unit 26 determines a switching position where the segment file 121 belonging to the group after the switching is output in units of MP4 samples. The rendering unit 2735 outputs an output signal generated from the bit stream of the segment file 121 belonging to the group after the switching from the switching position to an output device 30. Therefore, the client device 20 can shorten a time required for content switching.

The application control unit 26 calculates a processing time required to start reproduction of the bit stream of the segment file 121 of the group after the switching which has been accepted. The application control unit 26 determines the switching position on the basis of the processing time calculated by the application control unit 26. As described above, the client device 20 can shorten a time required for content switching by determining the switching position on the basis of the processing time.

In a case where the segment file 121 belonging to the group after the switching is stored in a first storage unit such as a segment buffer 252 and the like that stores the segment included in the bit stream of the received segment file 121, the download unit 251 does not receive the segment file 121. Therefore, the client device 20 can prevent redundant download.

In a case where the MP4 sample attribute information including group information indicating the group to which the MP4 sample belongs is added to the MP4 sample and stored in an MP4 sample buffer 272, the extraction unit 271 does not extract the MP4 sample belonging to the group after the switching on condition that the MP4 sample belonging to the group after the switching is stored in the MP4 sample buffer 272. Therefore, the client device 20 can prevent redundant demultiplexing.

A 3D audio decoder 273 does not decode the MP4 sample on condition that the output signal generated by decoding the MP4 sample belonging to the group after the switching is stored in an output buffer 274. Therefore, the client device 20 can prevent redundant decoding.

An analysis unit 2731 separates the MP4 sample into object data and metadata accompanying the object data. Therefore, the client device 20 can eliminate redundancy of selecting only desired data after executing both decoding of the object data and decoding of the metadata.

The download unit 251 deletes the segment stored in the segment buffer 252 on condition that a free space of the segment buffer 252 is less than a threshold. In other words, the download unit 251 holds the segment stored in the segment buffer 252 without deleting it on condition that the free space of the segment buffer 252 is more than or equal to the threshold. Therefore, the client device 20 can use the segment held without being deleted to avoid an image sound gap in a case where content switching is not completed.

The extraction unit 271 deletes the MP4 sample stored in the MP4 sample buffer 272 on condition that a free space of the MP4 sample buffer 272 is less than a threshold. In other words, the extraction unit 271 holds the MP4 sample stored in the MP4 sample buffer 272 without deleting it on condition that the free space of the MP4 sample buffer 272 is more than or equal to the threshold. Therefore, the client device 20 can use the MP4 sample held without being deleted to avoid an image sound gap in a case where content switching is not completed.

After outputting the output signal generated from the MP4 sample belonging to the group after the switching to the output device 30, the rendering unit 2735 deletes the output signal generated from the MP4 sample belonging to the group before the switching. In this way, by deleting the output signal generated from the MP4 sample belonging to the group before the switching after outputting the output signal to the output device 30, the rendering unit 2735 can be used to avoid an image sound gap in a case where content switching is not completed.

The extraction unit 271 adds the MP4 sample attribute information including possible point information indicating whether or not the MP4 sample can become the switching position. In a case where the possible point information included in the MP4 sample attribute information indicates that the MP4 sample can become the switching position, the application control unit 26 determines it as the switching position. Therefore, the client device 20 can shorten a time required for content switching even in a case where the MP4 samples are not arranged in output order.

In a case where the MP4 sample is a reference image in interframe prediction, the extraction unit 271 adds the MP4 sample attribute information including the possible point information indicating the possibility of becoming the switching position. Therefore, the client device 20 can shorten a time required for content switching even in a case where the segment file 121 has a GOP structure.

Note that the effects described in the present specification are merely examples and are not limited, and there may be other effects.

Note that the present technology can also have the following configurations.

(1)
An information processing device including:
a receiving unit that receives a segment file having a plurality of segments and a setting file in which a group to which the segment file belongs is set;
an extraction unit that extracts one or more MP4 samples included in the segment of the segment file received by the receiving unit and adds attribute information including a reproduction start time of the MP4 sample to the MP4 sample;
a determination unit that determines a switching position at which the segment file belonging to the group after switching is output in units of the MP4 samples on the basis of an accepted switching operation of the group and the attribute information; and
an output unit that outputs an output signal generated from the segment file belonging to the group after the switching from the switching position to an output device.

(2)
The information processing device according to (1), further including
a calculation unit that calculates a processing time required to start reproduction of the segment file of the group after the switching which has been accepted,
in which the determination unit determines the switching position on the basis of the processing time calculated by the calculation unit.

(3)
The information processing device according to (1) or (2),
in which the receiving unit does not receive the segment file in a case where the segment file belonging to the group after the switching is stored in a first storage unit that stores the segment included in the received segment file.

(4)
The information processing device according to any one of (1) to (3),
in which in a case where the attribute information including group information indicating the group to which the MP4 sample belongs is added to the MP4 sample and stored in a second storage unit, the extraction unit does not extract the MP4 sample belonging to the group after the switching on condition that the MP4 sample belonging to the group after the switching is stored in the second storage unit.

(5)
The information processing device according to any one of (1) to (4), further including
a decoding unit that does not decode the MP4 sample on condition that the output signal generated by decoding the MP4 sample belonging to the group after the switching is stored in a third storage unit.

(6)
The information processing device according to any one of (1) to (5), further including
a separating unit that separates the MP4 sample into object data and metadata accompanying the object data.

(7)
The information processing device according to (6),
in which the separating unit separates the MP4 sample into an audio object that is the object data and localization information of the audio object that is the metadata.

(8)
The information processing device according to (3),
in which the receiving unit deletes the segment stored in the first storage unit on condition that a free space of the first storage unit is less than a threshold.

(9)

The information processing device according to (4), in which the extraction unit deletes the MP4 sample stored in the second storage unit on condition that a free space of the second storage unit is less than a threshold.

(10)

The information processing device according to (5), in which after outputting the output signal generated from the MP4 sample belonging to the group after the switching to the output device, the output unit deletes the output signal generated from the MP4 sample belonging to the group before the switching.

(11)

The information processing device according to any one of (1) to (10), in which the extraction unit adds the attribute information including possible point information indicating whether or not the MP4 sample can become the switching position, and the determination unit determines the MP4 sample as the switching position in a case where the possible point information included in the attribute information of the MP4 sample indicates a possibility of becoming the switching position.

(12)

The information processing device according to (11), in which the extraction unit adds the attribute information including the possible point information indicating the possibility of becoming the switching position in a case where the MP4 sample is a reference image in interframe prediction.

(13)

An information processing method including:

receiving a segment file having a plurality of segments and a setting file in which a group to which the segment file belongs is set;

extracting one or more MP4 samples included in the segment of the received segment file, and adding attribute information including a reproduction start time of the MP4 sample to the MP4 sample;

determining a switching position at which the segment file belonging to the group after switching is output in units of the MP4 samples on the basis of an accepted switching operation of the group and the attribute information; and outputting an output signal generated from the segment file belonging to the group after the switching from the switching position to an output device.

(14)

An information processing program that causes a computer included in an information processing device to function as:

a receiving unit that receives a segment file having a plurality of segments and a setting file in which a group to which the segment file belongs is set;

an extraction unit that extracts one or more MP4 samples included in the segment of the segment file received by the receiving unit and adds attribute information including a reproduction start time of the MP4 sample to the MP4 sample;

a determination unit that determines a switching position at which the segment file belonging to the group after switching is output in units of the MP4 samples on the basis of an accepted switching operation of the group and the attribute information; and an output unit that outputs an output signal generated from the segment file belonging to the group after the switching from the switching position to an output device.

REFERENCE SIGNS LIST

1 Streaming system
10 Server device
20 Client device
30 Output device
25 HTTP access control unit
26 Application control unit
27 Media engine
121 Segment file
122 MPD file
251 Download unit
252 Segment buffer
271 Extraction unit
272 MP4 sample buffer
273 3D audio decoder
274 Output buffer
2731 Analysis unit
2732 Object decoder
2733 Metadata decoder
2734 Output intermediate buffer
2735 Rendering unit

The invention claimed is:

1. An information processing device, comprising:
a receiving unit configured to receive a segment file and a setting file in which a group to which the segment file belongs is set, wherein the segment file includes a plurality of segments;
an extraction unit configured to:
extract at least one MP4 sample from MP4 samples included in a segment of the plurality of segments of the received segment file; and
add attribute information to the at least one MP4 sample,
wherein the attribute information includes a reproduction start time of the at least one MP4 sample and group information that indicates the group to which the at least one MP4 sample belongs;
an input unit configured to accept a switching operation of the group;
a determination unit configured to determine, based on the accepted switching operation of the group and the attribute information, a switching position at which the segment file belonging to the group after the switching operation is output in units of the MP4 samples; and
an output unit configured to output an output signal corresponding to the switching position to an output device,
wherein the output signal is based on the segment file belonging to the group after the switching operation.

2. The information processing device according to claim 1, further comprising a calculation unit configured to calculate a processing time required to start reproduction of the segment file belonging to the group after the switching operation,
wherein the determination unit is further configured to determine the switching position based on the calculated processing time.

3. The information processing device according to claim 1, wherein
the determination unit is further configured to determine that the segment file belonging to the group after the switching operation is stored in a first storage unit that stores the segment included in the received segment file, and
the receiving unit is further configured to restrict the reception of the segment file based on the determination that the segment file belonging to the group after the switching operation is stored in the first storage unit.

4. The information processing device according to claim 3, wherein the receiving unit is further configured to delete the segment stored in the first storage unit based on a condition that a free space of the first storage unit is less than a threshold.

5. The information processing device according to claim 1, wherein
the determination unit is further configured to determine that the at least one MP4 sample belonging to the group after the switching operation is stored in a second storage unit, and
the extraction unit is further configured to restrict the extraction of the at least one MP4 sample, based on the determination that the at least one MP4 sample belonging to the group after the switching operation is stored in the second storage unit.

6. The information processing device according to claim 5, wherein the extraction unit is further configured to delete the at least one MP4 sample stored in the second storage unit based on a condition that a free space of the second storage unit is less than a threshold.

7. The information processing device according to claim 1, further comprising a decoding unit configured to restrict decode of the at least one MP4 sample based on a condition that the output signal generated by decoding the at least one MP4 sample belonging to the group after the switching operation is stored in a third storage unit.

8. The information processing device according to claim 7, wherein after the output of output signal generated from the at least one MP4 sample belonging to the group after the switching operation to the output device, the output unit is further configured to delete the output signal generated from the at least one MP4 sample belonging to the group before the switching operation.

9. The information processing device according to claim 1, further comprising a separating unit configured to separate the at least one MP4 sample into object data and metadata accompanying the object data.

10. The information processing device according to claim 9, wherein the separating unit is further configured to separate the at least one MP4 sample into an audio object that is the object data and localization information of the audio object that is the metadata.

11. The information processing device according to claim 1, wherein
the extraction unit is further configured to add the attribute information that includes possible point information indicating whether the at least one MP4 sample can become the switching position, and
the determination unit is further configured to determine the at least one MP4 sample as the switching position in a case where the possible point information indicates that the at least one MP4 sample can become the switching position.

12. The information processing device according to claim 11, wherein the extraction unit is further configured to add the attribute information that includes the possible point information in a case where the at least one MP4 sample is a reference image in interframe prediction.

13. An information processing method, comprising:
receiving a segment file and a setting file in which a group to which the segment file belongs is set, wherein the segment file includes a plurality of segments;
extracting at least one MP4 sample from MP4 samples included in a segment of the plurality of segments of the received segment file;
adding attribute information to the at least one MP4 sample,
wherein the attribute information includes a reproduction start time of the at least one MP4 sample and group information that indicates the group to which the at least one MP4 sample belongs;
accepting a switching operation of the group;
determining, based on the accepted switching operation of the group and the attribute information, a switching position at which the segment file belonging to the group after the switching operation is output in units of the MP4 samples; and
outputting an output signal corresponding to the switching position to an output device, wherein
the output signal is based on the segment file belonging to the group after the switching operation.

14. A non-transitory computer-readable medium having stored thereon, computer-executable instructions which, when executed by an information processing device, cause the information processing device to execute operations, the operations comprising:
receiving, by a receiving unit, a segment file and a setting file in which a group to which the segment file belongs is set, wherein the segment file includes a plurality of segments;
extracting, by an extraction unit, at least one MP4 sample from MP4 samples included in a segment of the plurality of segments of the received segment file;
adding, by the extraction unit, attribute information to the at least one MP4 sample,
wherein the attribute information includes a reproduction start time of the at least one MP4 sample and group information that indicates the group to which the at least one MP4 sample belongs;
accepting, by an input unit, a switching operation of the group;
determining, by a determination unit, based on the accepted switching operation of the group and the attribute information, a switching position at which the segment file belonging to the group after the switching operation is output in units of the MP4 samples; and
outputting, by an output unit, an output signal corresponding to the switching position to an output device, wherein
the output signal is based on the segment file belonging to the group after the switching operation.

* * * * *